United States Patent
Hara et al.

(10) Patent No.: US 9,335,984 B2
(45) Date of Patent: May 10, 2016

(54) DATA TRANSMISSION METHOD, TRANSMISSION-SOURCE INFORMATION PROCESSING APPARATUS, DATA TRANSMISSION SYSTEM, AND DATA TRANSMISSION PROGRAM

(75) Inventors: Kenta Hara, Kawasaki (JP); Tomohiro Ubukata, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 1266 days.

(21) Appl. No.: 13/240,694

(22) Filed: Sep. 22, 2011

(65) Prior Publication Data

US 2012/0084390 A1 Apr. 5, 2012

(30) Foreign Application Priority Data

Oct. 5, 2010 (JP) .................................. 2010-225512

(51) Int. Cl.
G06F 15/16 (2006.01)
G06F 9/445 (2006.01)
H04L 29/08 (2006.01)

(52) U.S. Cl.
CPC .............. G06F 8/63 (2013.01); H04L 67/1008 (2013.01); H04L 67/1029 (2013.01); H04L 67/1095 (2013.01); H04L 67/32 (2013.01)

(58) Field of Classification Search
CPC ............ H04L 67/1008; H04L 67/1029; H04L 67/1031; H04L 67/32; H04L 67/1002; H04N 21/2402
See application file for complete search history.

(56) References Cited

U.S. PATENT DOCUMENTS 8,150,409 B2 * 4/2012 Kim ...................... H04W 28/18
370/315
2003/0093491 A1 * 5/2003 Valjakka et al. .............. 709/214
2004/0107252 A1 * 6/2004 Futa ..................... H04L 12/2697
709/204
2006/0101462 A1 * 5/2006 Spears .......................... 717/177
2007/0097955 A1 * 5/2007 Li ........................ H04L 12/4633
370/352
2007/0157016 A1 7/2007 Dayan et al.
2007/0261056 A1 11/2007 Iizuka
2008/0168244 A1 * 7/2008 Chu Chen ........... G06F 11/1417
711/162
2009/0259734 A1 10/2009 Morikawa

FOREIGN PATENT DOCUMENTS

| JP | 2007-183918 A | 7/2007 |
|---|---|---|
| JP | 2007-219866 A | 8/2007 |
| JP | 2007-334602 A | 12/2007 |
| JP | 2009-271904 A | 11/2009 |

OTHER PUBLICATIONS

"SystemcastWizard Professional V5.0_Catalog", Jun 2010.

* cited by examiner

*Primary Examiner* — Chirag R Patel
(74) *Attorney, Agent, or Firm* — Oblon, McClelland, Maier & Neustadt, L.L.P.

(57) ABSTRACT

A data transmission method for transmitting data from a transmission-source information processing apparatus to a plurality of information processing apparatuses, includes: selecting an information processing apparatus from among the plurality of information processing apparatuses functioning as a relay information processing apparatus relay-transmitting data to another information processing apparatus, in accordance with the number of information processing apparatuses; transmitting the data to the relay information processing apparatus; and relay-transmitting the data received from the transmission-source information processing apparatus to the another information processing apparatus.

19 Claims, 18 Drawing Sheets

FIG. 3

| MACHINE NAME | CPU | MEMORY | TRANSMISSION RATE |
|---|---|---|---|
| PC001 | 1.8GHz | 1GB | 100 Mbps/HALF-DUPLEX |
| PC002 | 1.8GHz | 1GB | 1 Gbps/FULL-DUPLEX |
| PC003 | 2.0GHz | 2GB | 100 Mbps/FULL-DUPLEX |
| ⋮ | ⋮ | ⋮ | ⋮ |
| PC108 | 1.8GHz | 1GB | 100 Mbps/HALF-DUPLEX |
| PC109 | 3.0GHz | 4GB | 1 Gbps/FULL-DUPLEX |
| PC110 | 2.0GHz | 2GB | 1 Gbps/FULL-DUPLEX |

220

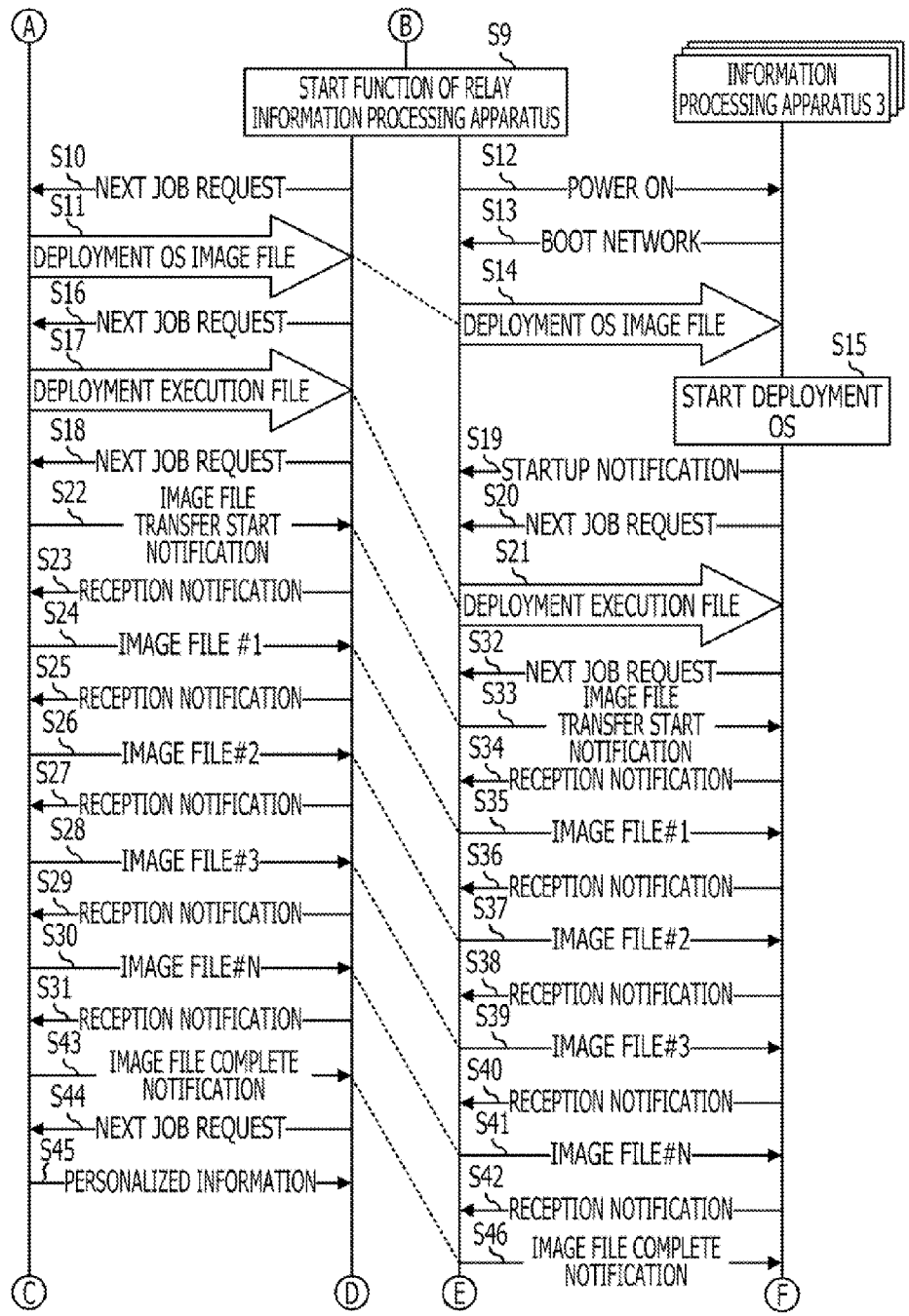

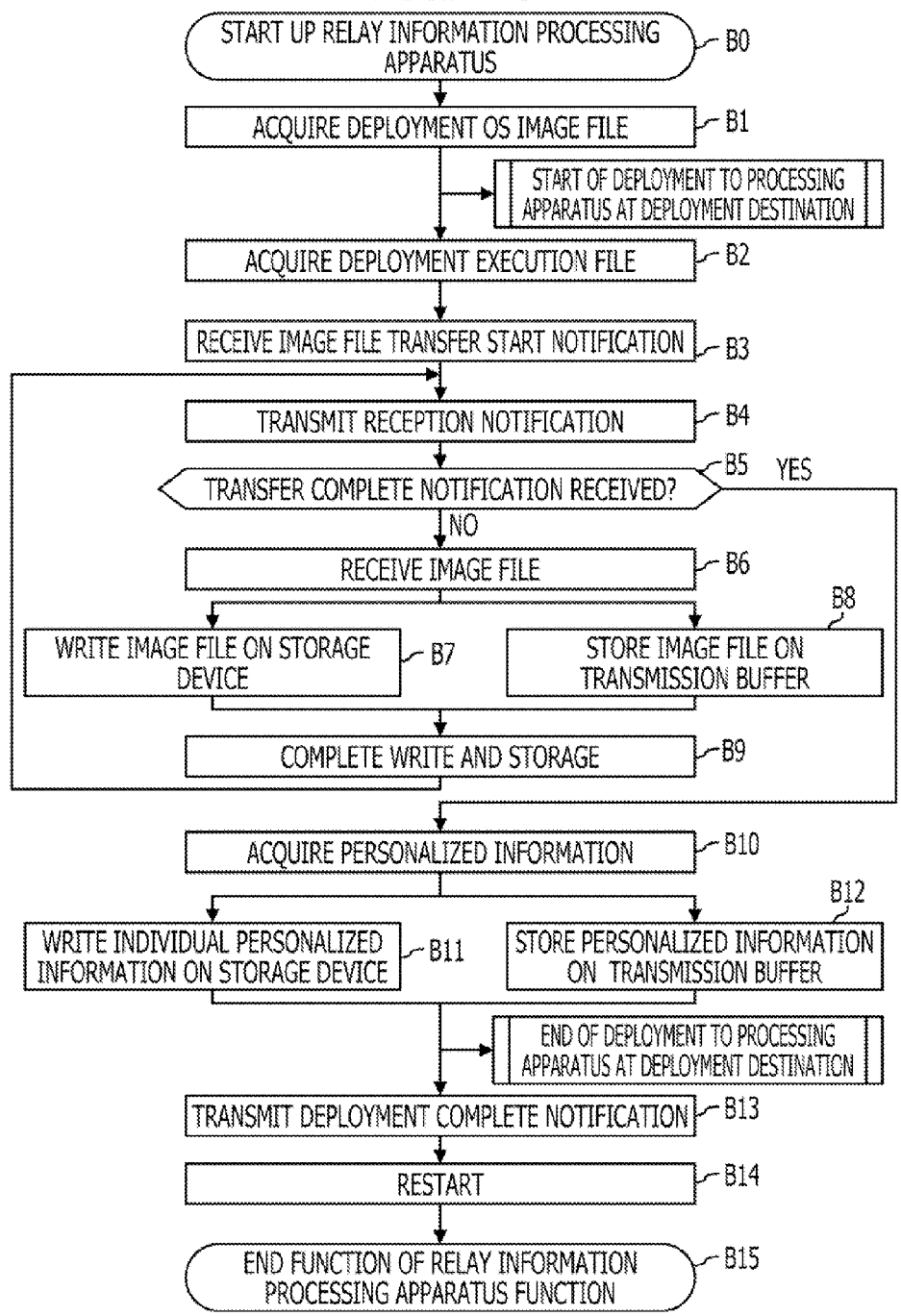

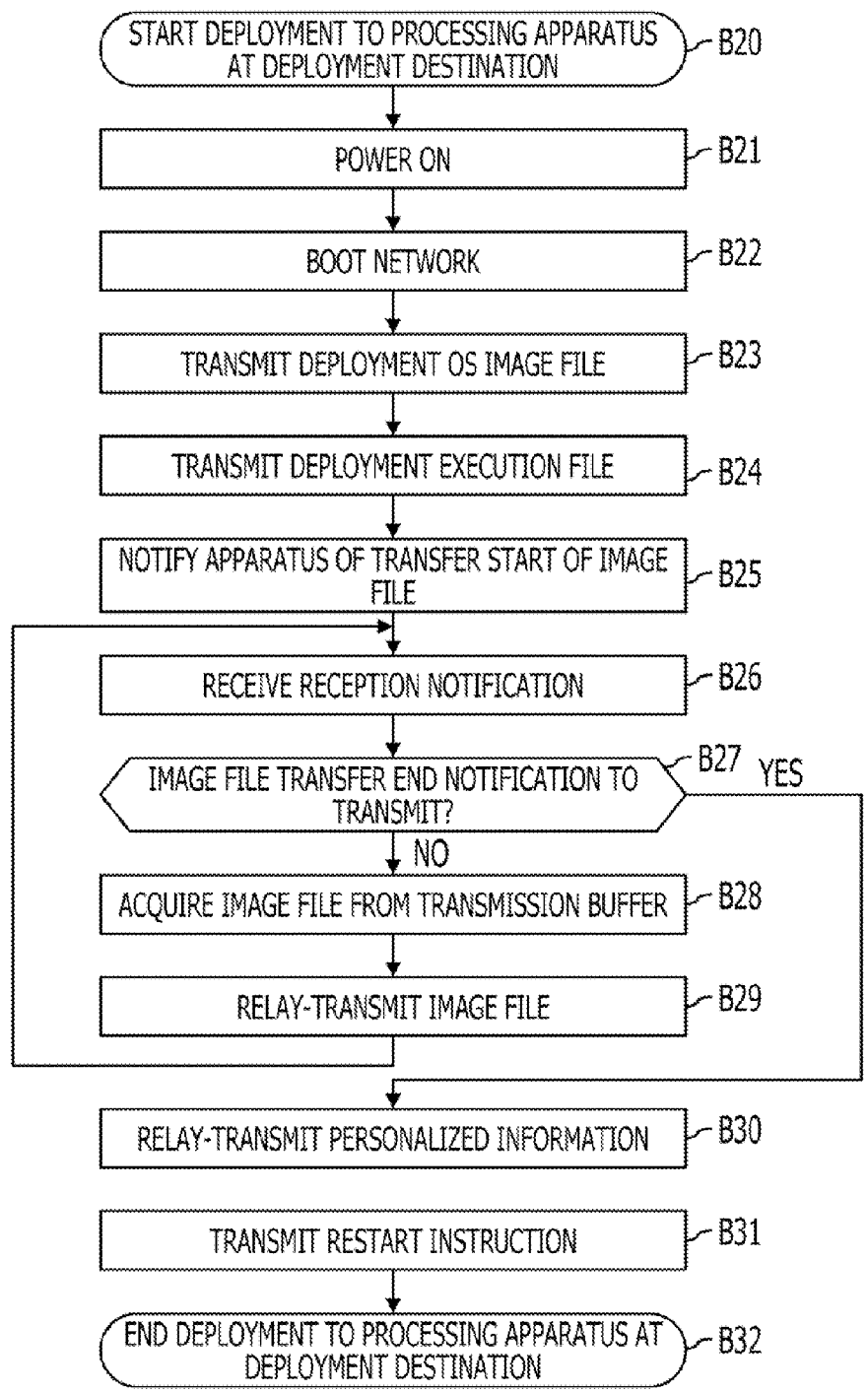

FIG. 15B

| PROCESSING APPARATUS | SEGMENT | IMAGE | RELAY INFORMATION PROCESSING APPARATUS |
|---|---|---|---|
| PC001~PC020 | SEGMENT A | IMAGE A | 4 UNITS |
| PC021~PC040 | SEGMENT A | IMAGE B | 4 UNITS |
| PC041~PC040 | SEGMENT A | IMAGE C | 4 UNITS |
| PC061~PC090 | SEGMENT B | IMAGE A | 5 UNITS |
| PC091~PC120 | SEGMENT B | IMAGE B | 5 UNITS |
| PC121~PC150 | SEGMENT C | IMAGE C | 5 UNITS |

FIG. 15A

| PROCESSING APPARATUS | SEGMENT | IMAGE |
|---|---|---|
| PC001~PC020 | SEGMENT A | IMAGE A |
| PC021~PC040 | SEGMENT A | IMAGE B |
| PC041~PC040 | SEGMENT A | IMAGE C |
| PC061~PC090 | SEGMENT B | IMAGE A |
| PC091~PC120 | SEGMENT B | IMAGE B |
| PC121~PC150 | SEGMENT C | IMAGE C |

DATA TRANSMISSION METHOD, TRANSMISSION-SOURCE INFORMATION PROCESSING APPARATUS, DATA TRANSMISSION SYSTEM, AND DATA TRANSMISSION PROGRAM

CROSS-REFERENCE TO RELATED APPLICATIONS

This application is based upon and claims the benefit of priority of the prior Japanese Patent Application No. 2010-225512, filed on Oct. 5, 2010, the entire contents of which are incorporated herein by reference.

FIELD

The present invention relates to a data transmission method, a transmission-source information processing apparatus, a data transmission system, and a data transmission program.

BACKGROUND

Deployment techniques are available to produce an image file on an information processing apparatus such as a personal computer (PC), and deploy the image file on another information apparatus via a network using a deployment server.

FIG. 16 illustrates an image file deployment method of related art. A system 100 includes a deployment server 200 and information processing apparatuses 300. The deployment server 200 directly deploys on each information processing apparatus 300 an image stored on an external or internal storage device (not illustrated) via multicast communication or unicast communication.

If the image is concurrently deployed on a large number of information processing apparatuses, the multicast communication is used to reduce the workload on the network.

If the deployment server concurrently deploys the image file on a large number of information processing apparatuses, the workload carried by the deployment server to manage the information processing apparatuses and the network workload increase. Time to deploy the image file increases as the number of information processing apparatuses increases.

If the image file suffers from a lack of data, even if partially, the information processing apparatus having received the image file has difficulty in using the image file. The image file is thus reliably distributed, and if data is missing, the missing data should be recovered.

In the retransmission control of the multicast communication, the deployment server typically employs a technique of verifying a reception notification of a packet from each information processing apparatus as a deployment destination. If at least one of the PCs as the deployment destinations suffers from data missing such as a packet loss in accordance with the technique, retransmission is performed via multicast communication. If the retransmission control frequently occurs during the deployment of the image file, time to complete the image deployment increases.

The retransmission control and the workload carried by the deployment server to manage a large number of information processing apparatuses at a time cause an increase in the time to deploy the image file as the number of information processing apparatuses increases.

SUMMARY

According to an aspect of the embodiment, a data transmission method for transmitting data from a transmission-source information processing apparatus to a plurality of information processing apparatuses, includes: selecting an information processing apparatus from among the plurality of information processing apparatuses functioning as a relay information processing apparatus relay-transmitting (relaying) data to another information processing apparatus, in accordance with the number of information processing apparatuses; transmitting the data to the relay information processing apparatus; and relay-transmitting (relaying) the data received from the transmission-source information processing apparatus to the another information processing apparatus.

The object and advantages of the embodiment will be realized and attained by at least the features, elements, and combinations particularly pointed out in the claims.

It is to be understood that both the foregoing general description and the following detailed description are exemplary and explanatory and are not restrictive of the embodiment, as claimed.

BRIEF DESCRIPTION OF THE DRAWINGS

FIG. 3 illustrates an example of the information processing apparatus performance information of the embodiment;

FIGS. 12A, 12B and 12C illustrates the operation of the system in accordance with the embodiment;

FIG. 13 is a flowchart illustrating an operation of a transmission-source information processing apparatus with the relay information processing apparatus in accordance with the embodiment;

FIG. 14 is a flowchart illustrating an operation of a processing apparatus with the relay information processing apparatus in accordance with the embodiment;

FIGS. 15A and 15B illustrate an operation of the calculating unit; and

DESCRIPTION OF EMBODIMENTS

Figure 1:
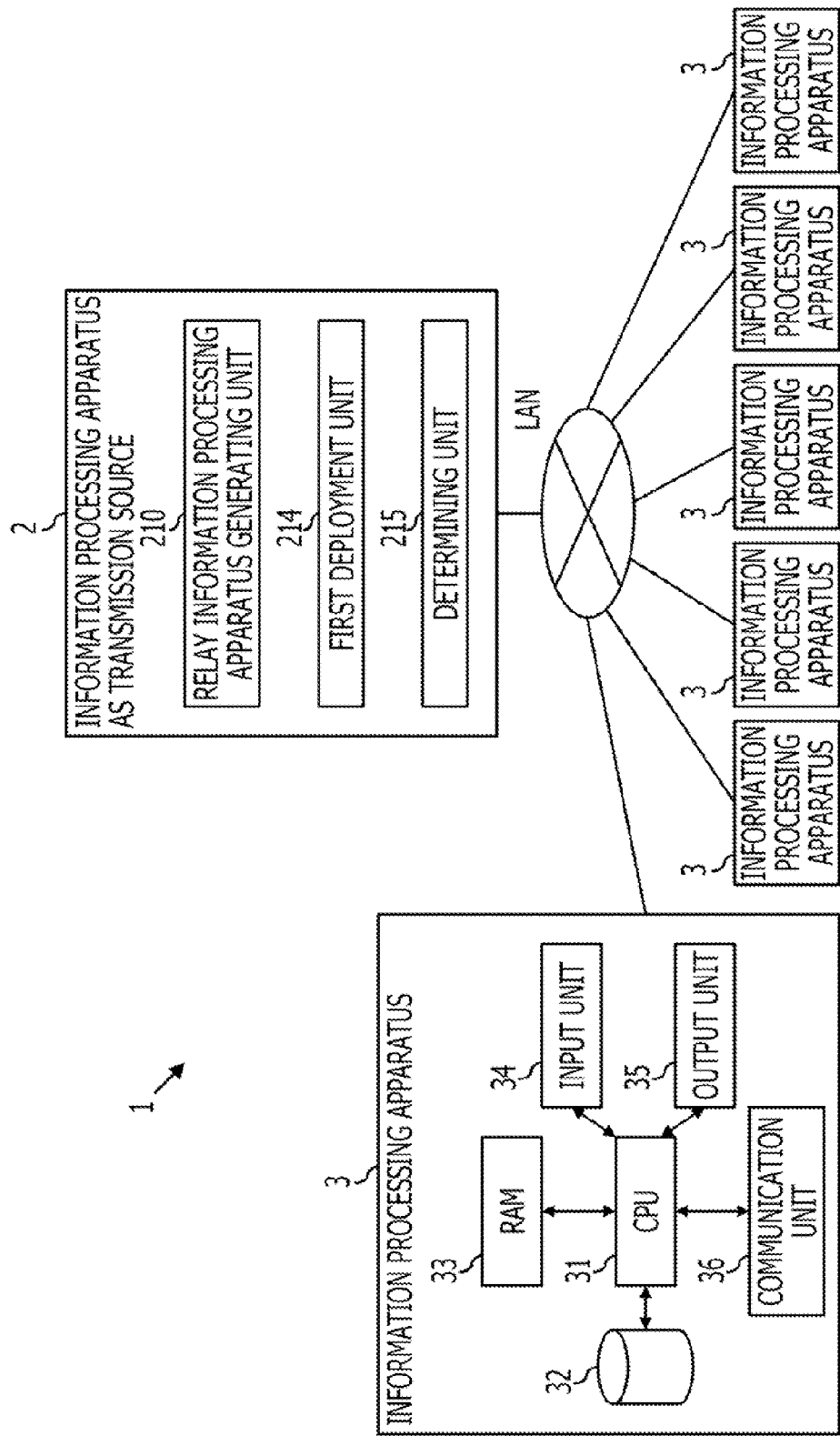
FIG. 1 illustrates a configuration of a system of one embodiment.

Referring to the drawings, a data transmission method, a transmission-source information processing apparatus, a data transmission system, and a data transmission program are described as embodiments.

A. Description of Embodiments

FIG. 1 illustrates a configuration of a system 1 of one embodiment. The system 1 of FIG. 1 includes a transmission-source information processing apparatus 2 and a plurality of information processing apparatuses 3. The transmission-source information processing apparatus 2 is connected to the plurality of information processing apparatuses 3 via a local-area network (LAN) for communication. The plurality of information processing apparatuses 3 are interconnected to each other via the LAN.

The transmission-source information processing apparatus 2 is an information processing apparatus that transmits data such as an image file to the information processing apparatus 3. For example, the transmission-source information processing apparatus 2 is a deployment server that deploys the image file on the information processing apparatus 3.

In the discussion of the technique, the deployment of the image file includes transmitting the image file to the information processing apparatus 3 and transmitting personalized information such as a machine name, Internet Protocol (IP) addresses, and etc of the targeted information processing apparatus 3.

The image file refers to a file of data of an OS and application programs, implementing a system environment, and being in an installed state on a storage device of the information processing apparatus. If the image file is deployed on the storage device of another information processing apparatus, the same system environment is constructed on the other information processing apparatus.

The transmission-source information processing apparatus 2 includes a relay information processing apparatus generating unit 210 and a first deployment unit 214.

The relay information processing apparatus generating unit 210 causes a specific information processing apparatus 3 to operate as a relay information processing apparatus temporarily. The relay information processing apparatus relay-transmits (relaying) data such the image file to another information processing apparatus 3. The relay information processing apparatus generating unit 210 causes the specific information processing apparatus 3 to function as a deployment server that deploys the image file on the other information processing apparatus 3. The operation of causing the specific information processing apparatus 3 to function as the relay information processing apparatus temporarily is described in detail below.

The information processing apparatus functioning as a relay information processing apparatus is referred to as the relay information processing apparatus.

The first deployment unit 214 deploys the image file on the relay information processing apparatus. With the relay information processing apparatus, the image file is deployed on all the information processing apparatuses. The transmission-source information processing apparatus 2 is free from the responsibility of directly deploying the image file on all the information processing apparatuses via multicast communication. The operation is described in detail below.

The information processing apparatus 3 is a personal computer (PC), for example. The information processing apparatus 3 implements a system environment represented by the image file, by executing the image file transmitted from one of the transmission-source information processing apparatus 2 and the relay information processing apparatus. The information processing apparatus 3 may include central processing unit (CPU) 31, storage device 32, random-access memory (RAM) 33, input unit 34, output unit 35, and communication unit 36. The hardware structure of the information processing apparatus 3 is described in detail below.

FIG. 1 illustrates the hardware structure of one of the information processing apparatuses 3 in detail. The other information processing apparatuses 3 also have the same structure.

The information processing apparatus 3 may also be simply referred to as a processing apparatus 3.

Figure 2:
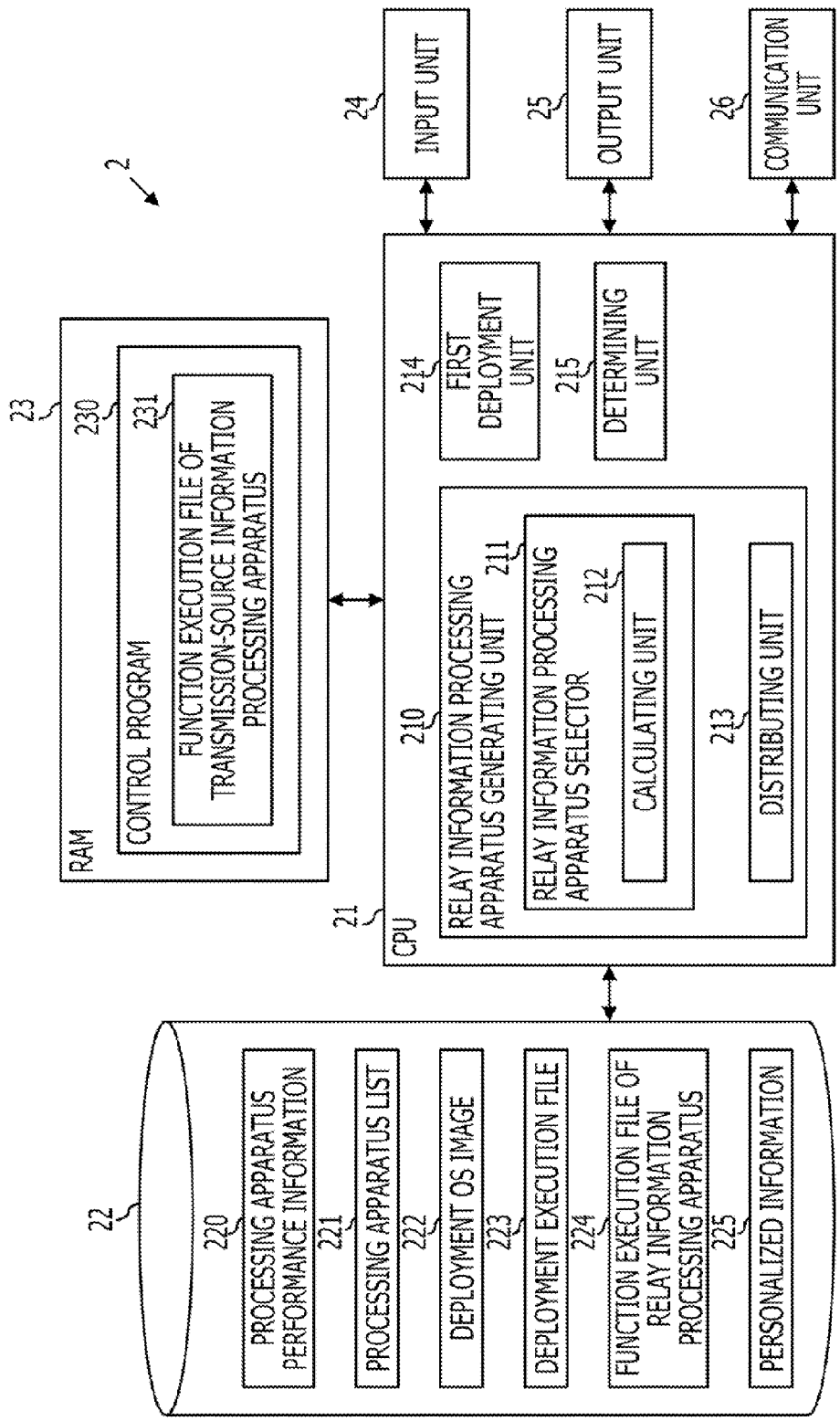
FIG. 2 illustrates a structure of a transmission-source information processing apparatus of the embodiment.

FIG. 2 illustrates the structure of the transmission-source information processing apparatus 2 as the embodiment.

The transmission-source information processing apparatus 2 includes CPU 21, storage device 22, RAM 23, input unit 24, output unit 25, and communication unit 26.

The storage device 22 may be a hard disk drive (HDD) or a solid state drive (SSD), and stores a variety of information. The storage device 22 stores processing apparatus performance information 220, processing apparatus list 221, deployment OS image 222, deployment execution file 223, function execution file 224 of the relay information processing apparatus, and personalized information 225. The storage device 22 may also store an image file (not illustrated) to be deployed on the processing apparatus 3.

The processing apparatus performance information 220 represents performance of the processing apparatus 3. The performance of the processing apparatus 3 refers to the capacity of a memory of the processing apparatus 3, transmission rate of the processing apparatus 3, and performance of the CPU of the processing apparatus 3 (clock frequency, for example).

FIG. 3 illustrates an example of the processing apparatus performance information 220. FIG. 3 lists 110 processing apparatuses 3 and maps information identifying each processing apparatus 3 (machine name in the embodiment) to the performance of the CPU (clock frequency), the memory capacity and the transmission rate of each processing apparatus 3.

The processing apparatus list 221 indicates the processing apparatus 3, as a deployment destination on which the relay information processing apparatus is to deploy the image file, for each processing apparatus generated by the relay information processing apparatus generating unit 210 to be discussed below. The processing apparatus list 221 is produced by the relay information processing apparatus generating unit 210 and the determining unit 215 to be described below.

The deployment OS image 222 is an OS image file running on the RAM 33 of the processing apparatus 3. For example, the deployment OS image 222 is a Windows (registered trademark) PE image file.

The deployment execution file 223 runs on the deployment OS. More specifically, the deployment execution file 223 is an execution file running on the RAM 33 of the processing apparatus 3. The deployment execution file 223, if executed by the CPU 31 of the processing apparatus 3, performs a function of storing a fragmented and deployed image file on the storage device 32.

The function execution file 224 of the relay information processing apparatus runs on the deployment OS. More specifically, the function execution file 224 of the relay information processing apparatus runs on the RAM 33 of the processing apparatus 3. The function execution file 224 of the relay information processing apparatus, if executed by the CPU 31, causes the processing apparatus 3 to function as a relay information processing apparatus.

More specifically, the function execution file 224 of the relay information processing apparatus, if executed by the CPU 31 of the processing apparatus 3, buffers the deployed image file from the transmission-source information processing apparatus 2, and then transmits the deployed image file to the processing apparatus 3.

The personalized information 225 is personalized information of each of the processing apparatuses 3, and may include a machine name, an IP address, and etc of the processing apparatus 3.

The RAM 23 is a main memory storing data and programs temporarily. For example, the RAM 23 stores the control program 230, and the function execution file 231 of the transmission-source information processing apparatus. The RAM 23 also functions as a buffer for transmission and reception.

The control program 230 is an OS running on the RAM 23 of the transmission-source information processing apparatus 2.

The function execution file 231 of the transmission-source information processing apparatus runs on the control program 230. More specifically, the function execution file 231 of the transmission-source information processing apparatus runs on the RAM 23 of the transmission-source information processing apparatus 2. The function execution file 231 of the transmission-source information processing apparatus, if executed by the CPU 21, functions as the relay information processing apparatus generating unit 210, the relay information processing apparatus selector 211, the calculating unit 212, the distributing unit 213, the first deployment unit 214, and the determining unit 215.

The CPU 21 performs a variety of processes and control by executing a variety of application programs stored on the storage device such as the RAM, and thus performs a variety of functions.

Specifically, the CPU 21 executes the function execution file 231 of the transmission-source information processing apparatus stored on the RAM 23. The CPU 21 thus functions as the relay information processing apparatus generating unit 210, the relay information processing apparatus selector 211, the calculating unit 212, the distributing unit 213, the first deployment unit 214, and the determining unit 215.

The relay information processing apparatus generating unit 210 causes the processing apparatus 3 to function as the relay information processing apparatus deploying the image file. More specifically, the relay information processing apparatus generating unit 210 causes at least one of the information processing apparatuses to function temporarily as the relay information processing apparatus relay-transmitting the image file.

The relay information processing apparatus generating unit 210 includes the relay information processing apparatus selector 211 and the distributing unit 213.

The relay information processing apparatus selector 211 selects from among the processing apparatuses 3 a processing apparatus 3 that functions as the relay information processing apparatus. In other words, the relay information processing apparatus selector 211 selects from a plurality of processing apparatuses 3 one processing apparatus 3 as the relay information processing apparatus that relay-transmits the data to another processing apparatus 3. The relay information processing apparatus selector 211 determines the processing apparatus 3 functioning as the relay information processing apparatus in accordance with the number of processing apparatuses 3 and the performance of the processing apparatuses 3. In accordance with the number of information processing apparatuses, the relay information processing apparatus selector 211 functions as a selector that selects from among the information processing apparatuses the information processing apparatus that is caused to function as the relay information processing apparatus relay-transmitting data to another information processing apparatus.

The relay information processing apparatus selector 211, including the calculating unit 212, selects the processing apparatus 3 in accordance with the number of relay information processing apparatuses calculated by the calculating unit 212 and performance information of the processing apparatuses.

The relay information processing apparatus selector 211 references the processing apparatus performance information 220 stored on the storage device 22, and then selects the processing apparatus 3 featuring excellent performance indicated by the performance information. For example, if the calculating unit 212 calculates the needed number of relay information processing apparatuses as being 10, the relay information processing apparatus selector 211 selects 10 processing apparatuses 3 in the order from high to low memory capacity. Given the same memory capacity, the relay information processing apparatus selector 211 references the transmission rate and the CPU performance, and then selects the processing apparatuses 3 in the order from high to low performance.

The calculating unit 212 then calculates the needed number of relay information processing apparatuses in accordance with the number of processing apparatuses 3.

More specifically, the relay information processing apparatus selector 211 including the calculating unit 212 functions as a calculator. The calculating unit 212 calculates the number of relay information processing apparatuses in accordance with the number of information processing apparatuses, and selects relay information processing apparatuses of the calculated number in accordance with the performance of the information processing apparatuses.

More specifically, the calculating unit 212 calculates the needed number of relay information processing apparatuses as described below.

Figure 4:
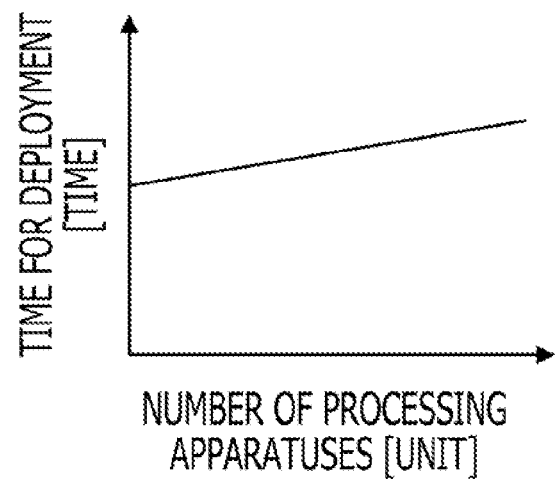
FIG. 4 illustrates a relationship between the number of processing apparatuses and time to deploy in accordance with the embodiment.

If the transmission-source information processing apparatus 2 deploys the image file on a large number of processing apparatuses 3 via multicast communication, the time to deploy the image file increases because of the network load or the other factors as the number of processing apparatuses 3 increases. FIG. 4 illustrates a relationship between the number of processing apparatuses 3 and the time to deploy the image file.

As illustrated in FIG. 4, the time to deploy the image file is substantially proportional to the number of processing apparatuses 3. It is assumed here that the time to deploy the image file is substantially proportional to the number of processing apparatuses 3. Let N represent the number of processing apparatuses 3, and t1 represent the time the transmission-source information processing apparatus 2 takes to deploy the image file on a single processing apparatus 3, and time t the transmission-source information processing apparatus 2 takes to deploy the image file on the processing apparatuses is represented by Equation (1):

$$t = aN + t1 \, (a\text{:constant}) \tag{1}$$

The number of relay information processing apparatuses causing the time to deploy to be shortest in the deployment of the image file on P processing apparatuses 3 is calculated in accordance with Equation (1).

Let S be the needed number of relay information processing apparatuses, and R be the number of processing apparatuses 3 as the deployment destinations of a single relay information processing apparatus, and P is represented by Equation (2):

$$P = SR + S \tag{2}$$

Time T1 the transmission-source information processing apparatus 2 takes to deploy the image file on S relay information processing apparatuses is represented as Equation (3) using Equation (1):

$$T1 = aS + t1 \quad (3)$$

Time T2 the relay information processing apparatus takes to deploy the image file on R processing apparatuses 3 as the deployment destinations are represented as Equation (4):

$$T2 = aR + t1 \quad (4)$$

In Equations (3) and (4), times the transmission-source information processing apparatus 2 and the relay information processing apparatus take to deploy the image file on a single processing apparatus 3 are equal to each other.

The time to deploy the image file is shortest if the relay information processing apparatus completes the deployment on the processing apparatuses 3 as the deployment destinations at the same time when the transmission-source information processing apparatus 2 completes the deployment on the relay information processing apparatuses. More specifically, the time for the deployment on the processing apparatuses 3 by the relay information processing apparatus, i.e., the time for the deployment of the image file on all the processing apparatuses 3 is shortest if T1=T2. From Equations (3) and (4), Equation (5) is derived.

$$aS + t1 = aR + t1$$

$$\therefore S = R \quad (5)$$

where if Equation (2) and Equation (5) are combined and reorganized, Equation (6) results:

$$S^2 + S - P = 0 \quad (6)$$

Solving Equation (6) results in the number of relay information processing apparatuses causing the time to deploy the image file on all the processing apparatuses 3 to be shortest.

Here, 110 processing apparatuses 3 may be used, all the processing apparatuses 3 may be connected to the same switch as that of the transmission-source information processing apparatus 2 (for example, an L3 switch), and an image file A may deployed on all the relay information processing apparatuses. In such a case, the number of relay information processing apparatuses is 10 in accordance with Equation (6). If a decimal fractional value is included in the solution of Equation (6), the decimal fractional value may be rounded up or rounded down.

The distributing unit 213 distributes (transmits), to the processing apparatus 3 selected as the relay information processing apparatus by the relay information processing apparatus selector 211, information causing the processing apparatus 3 to function as the relay information processing apparatus. For example, the distributing unit 213 distributes to the processing apparatus 3 selected as the relay information processing apparatus, part of the processing apparatus list 221 corresponding to the relay information processing apparatus, the deployment OS image 222, and the function execution file 224 of the relay information processing apparatus. The part of the processing apparatus list 221 is information indicating the processing apparatus 3 on which the relay information processing apparatus deploys the image file. More specifically, the distributing unit 213 functions as a distributor distributing specific information to the relay information processing apparatus selected by the selector. The specific information causes the relay information processing apparatus to start up as a relay information processing apparatus if the specific information is processed on the main memory of the relay information processing apparatus. The function execution file 224 of the relay information processing apparatus is an example of an execution file for causing the relay information processing apparatus to perform the function of relay-transmitting the data to at least one of the processing apparatuses 3. The part of the processing apparatus list 221 is an example of information identifying the information processing apparatus functioning as a relay-transmission destination, to which the relay information processing apparatus relay-transmits the data.

The distributing unit 213 distributes (transmits) information input by a user through the input unit 24 to the processing apparatus 3 functioning as the relay information processing apparatus. The information causes the processing apparatus 3 to function as the relay information processing apparatus.

The first deployment unit 214 fragments an image file (not illustrated) stored on the storage device 22 or an image file stored on an external storage device (not illustrated), and then transmits the fragmented image file to the processing apparatus 3 functioning as the relay information processing apparatus. More specifically, the first deployment unit 214 functions as a first transmitter transmitting the data to the relay information processing apparatus. Optionally, the first deployment unit 214 may transmit the image file without fragmenting the image file.

The first deployment unit 214 further transmits the deployment execution file 223 and the personalized information 225 to the processing apparatus 3 functioning as the relay information processing apparatus. In this case, the first deployment unit 214 transmits to the relay information processing apparatus the personalized information of the relay information processing apparatus and the personalized information of the processing apparatus 3 as the deployment destination of the relay information processing apparatus.

More specifically, the first deployment unit 214 deploys the image file by transmitting the image file and the personalized information to the processing apparatus 3 functioning as the relay information processing apparatus.

The first deployment unit 214 may selectively use multicast communication for transmitting specific information to a large number of processing apparatuses and unicast communication for transmitting the specific information to a single processing apparatus.

The determining unit 215 determines the processing apparatus 3 as the deployment destination of the image file, e.g., as the deployment destination of the processing apparatus 3 functioning as the relay information processing apparatus. In other words, the determining unit 215 determines the processing apparatus 3 as a relay-transmission destination to which the relay information processing apparatus transmits the data. The determining unit 215 determines the processing apparatus 3 on which each relay information processing apparatus deploys the image file, in accordance with the total number of processing apparatuses 3 and the number of relay information processing apparatuses. More specifically, the determining unit 215 determines the number of processing apparatuses 3 on which the relay information processing apparatus deploys the image file such that the number of processing apparatuses 3 handled by one relay information processing apparatus is as equal as possible to the number of processing apparatuses 3 handled by another relay information processing apparatus. More specifically, if the total number of processing apparatuses 3 is 110 with the number of relay information processing apparatuses being 10, the number of processing apparatuses 3 on which each relay information processing apparatus deploys the image file is 10. The number of relay information processing apparatuses is subtracted from the total number of processing apparatuses 3, and the resulting difference is then divided by the number of relay information processing apparatuses. The number of processing apparatuses 3 on which each relay information processing apparatus deploys the image file is thus determined. The determining unit 215 determines the information processing apparatus functioning as a relay-transmission destination, in accordance with the number of information processing apparatuses and the number of relay information processing apparatuses.

The determining unit 215 determines the assignment of the processing apparatus 3 as the deployment destination to each relay information processing apparatus, in accordance with the number of processing apparatuses 3 on which the relay information processing apparatus deploys the image file. The determination of the deployment destination of the relay information processing apparatus may be performed in the descending order of machine names. The technique is not limited to this arrangement. The determination of the deployment destination of the relay information processing apparatus may be performed in the ascending order of machine names or in a random fashion. It is sufficient if the numbers of processing apparatuses 3 as the deployment destinations of the relay information processing apparatuses are as even as possible.

The determining unit 215 determines the number of processing apparatuses 3 on which the relay information processing apparatus deploys the image file, thereby producing the processing apparatus list 221.

Figure 5:
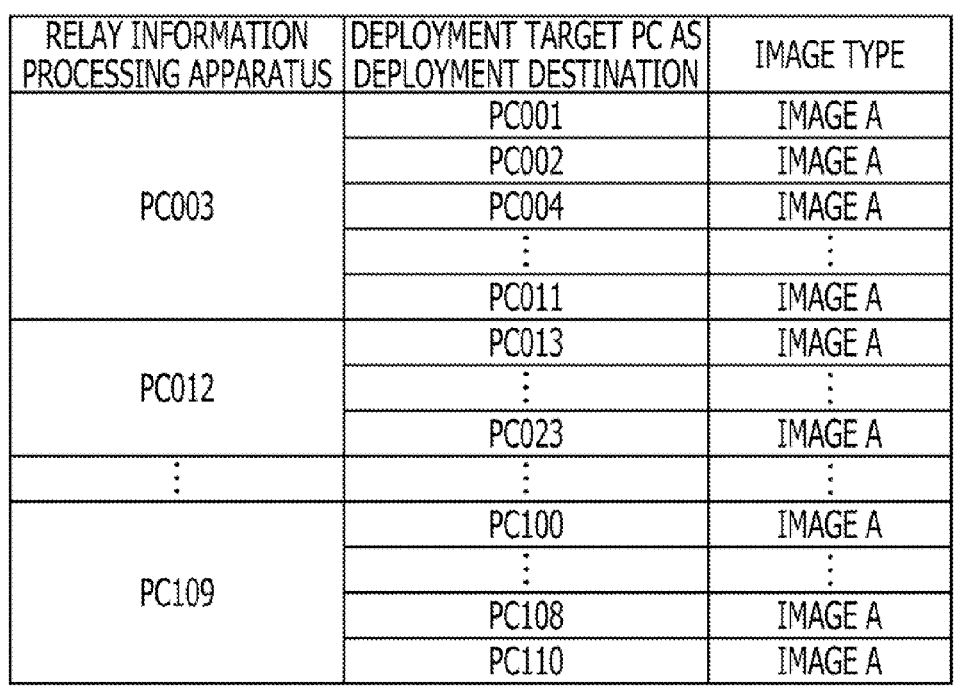
FIG. 5 illustrates a processing apparatus list in accordance with the embodiment.

FIG. 5 illustrates the processing apparatus list 221. As illustrated in FIG. 5, 110 processing apparatuses 3 are used, and PC003, PC012, . . . , PC109 (a total of 10 units) function as the relay information processing apparatuses. PC001-PC110 are machine names of the processing apparatuses 3. The machine names are partially omitted for simplicity.

As illustrated in FIG. 5, the determining unit 215 determines PC001, PC002, PC004-PC011 as the deployment destinations (relay-transmission destinations) of PC003, and PC013-PC023 as the deployment destinations of PC012. The determining unit 215 further determines PC100-PC108 and PC110 as the deployment destinations of PC109. Each relay information processing apparatus has 10 processing apparatuses 3 as the deployment destinations thereof.

PC003 relay-transmits the image file transmitted from the transmission-source information processing apparatus 2 to PC001, PC002, and PC004-PC011. Similarly, PC012 relay-transmits the image file transmitted from the transmission-source information processing apparatus 2 to PC013-PC023, and PC109 relay-transmits the image file transmitted from the transmission-source information processing apparatus 2 to PC100-PC108 and PC110. As illustrated in FIG. 5, the image file to be transmitted is the image A. The type of image file deployed on the processing apparatuses 3 including the relay information processing apparatus may be specified by the user who the input unit 24 to be discussed later. The type of image file specified by the user is stored with the processing apparatus 3 mapped thereto on the storage device 22.

The input unit 24 includes input devices such as a keyboard and a mouse, and a variety of information including the processing apparatus performance information 220 may be input via the input unit 24. Using the input unit 24, the user may select the processing apparatus 3 functioning as the relay information processing apparatus.

The output unit 25 includes a display device and displays a variety of information in response to an instruction from the CPU 21.

The communication unit 26 controls communications with another apparatus connected thereto via a network such as a LAN.

Figure 6:
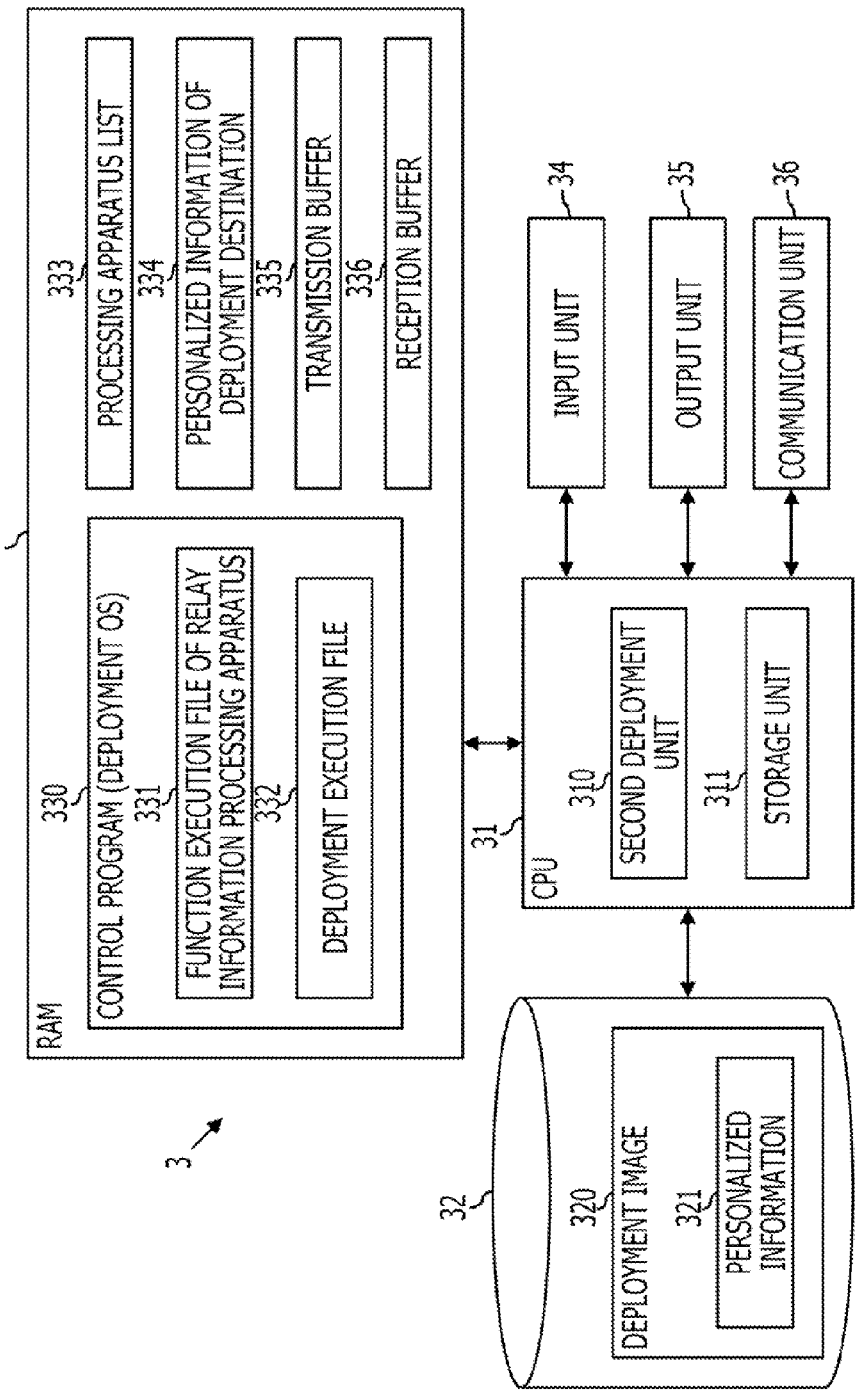
FIG. 6 illustrates a relay information processing apparatus in accordance with the embodiment.

FIG. 6 illustrates a functional block diagram of the relay information processing apparatus of one embodiment generated by the relay information processing apparatus generating unit 210.

Since the processing apparatus 3 also operates as the relay information processing apparatus, the hardware structure of the relay information processing apparatus remains unchanged from the structure of the processing apparatus 3 illustrated in FIG. 1. As the processing apparatus 3, the relay information processing apparatus includes the CPU 31, the storage device 32, the RAM 33, the input unit 34, the output unit 35, and the communication unit 36.

The storage device 32 is an HDD or SSD, and stores a variety of information. The storage device 32 stores a variety of image files and information transmitted from the transmission-source information processing apparatus 2. More specifically, the storage device 32 stores an image file and the personalized information of own device out of the personalized information 225, transmitted by the first deployment unit 214.

The RAM 33 is a main memory device storing data and programs temporarily. The RAM 33 stores a variety of information. For example, the RAM 33 stores control program 330, function execution file 331 of the relay information processing apparatus, deployment execution file 332, processing apparatus list 333, and personalized information 334 of the deployment destination.

The control program 330 is a deployment OS that is stored on the RAM 33 when the CPU 31 executes the deployment OS image 222 distributed by the distributing unit 213.

The function execution file 331 of the relay information processing apparatus is the function execution file 224 of the relay information processing apparatus transmitted by the transmission-source information processing apparatus 2.

The deployment execution file 332 is the deployment execution file 223 transmitted from the transmission-source information processing apparatus 2.

The processing apparatus list 333 is information representing the processing apparatus 3 functioning as the deployment destination of the relay information processing apparatus. In other words, the processing apparatus list 333 is part of the processing apparatus list 221.

The personalized information 334 of the deployment destination is the personalized information of the processing apparatus 3 as the deployment destination of the relay information processing apparatus, and is part of the personalized information 225.

The RAM 33 functions as a transmission buffer 335 and a reception buffer 336.

The transmission buffer 335 temporarily stores a variety of information including the image file and the personalized information when the relay information processing apparatus transmits the variety of information to the processing apparatus 3 determined as the deployment destination by the determining unit 215.

The reception buffer 336 temporarily stores a variety of information including the transmitted image file and the personalized information, transmitted from the transmission-source information processing apparatus 2.

The CPU 31 executes a variety of application programs stored on the storage device such as the RAM, thereby performing calculation and control operations. The CPU 31 thus performs a variety of functions.

The CPU 31 executes the function execution file 331 of the relay information processing apparatus stored on the RAM 33, thereby functioning as the second deployment unit 310.

The CPU 31 further executes the deployment execution file 332 stored on the RAM 33, thereby functioning as the storage unit 311.

The second deployment unit 310 relay-transmits the deployed image from the transmission-source information processing apparatus 2 to the processing apparatus 3 as the deployment destination determined by the determining unit 215. More specifically, the second deployment unit 310 functions as a second transmitter to relay-transmit the data received from the transmission-source information processing apparatus 2 to at least one of the information processing apparatuses. The relay information processing apparatus stores the distributed specific information on the main storage device thereof, and processes the specific information on the main storage device, thereby starting up as a relay information processing apparatus.

The second deployment unit 310 relay-transmits the deployment OS image 222, the deployment execution file 223, and the personalized information 225 of the deployment destination, distributed by the transmission-source information processing apparatus 2 to the processing apparatus 3 as the deployment destination determined by the determining unit 215.

The second deployment unit 310 deploys the image file by transmitting the image file and the personalized information to the processing apparatus 3 as the deployment destination, thereby deploying the image file. The second deployment unit 310 may selectively use the multicast communication and the unicast communication.

The storage unit 311 stores on the storage device 32 the deployment image 320 transmitted from the transmission-source information processing apparatus 2, and writes the personalized information of own apparatus.

The input unit 34 includes input devices such as a keyboard and a mouse, and receives a variety of information.

The output unit 35 including a display device displays a variety of information in response to an instruction from the CPU 31.

The communication unit 36 controls communications with another apparatus connected thereto via a network such as a LAN.

The RAM 33 on the processing apparatus 3 not functioning as the relay information processing apparatus does not store the function execution file 331 of the relay information processing apparatus, the processing apparatus list 333, and the personalized information 334 of the deployment destination. The CPU 31 on the processing apparatus 3 not functioning as the relay information processing apparatus has no function as the second deployment unit.

Figure 7:
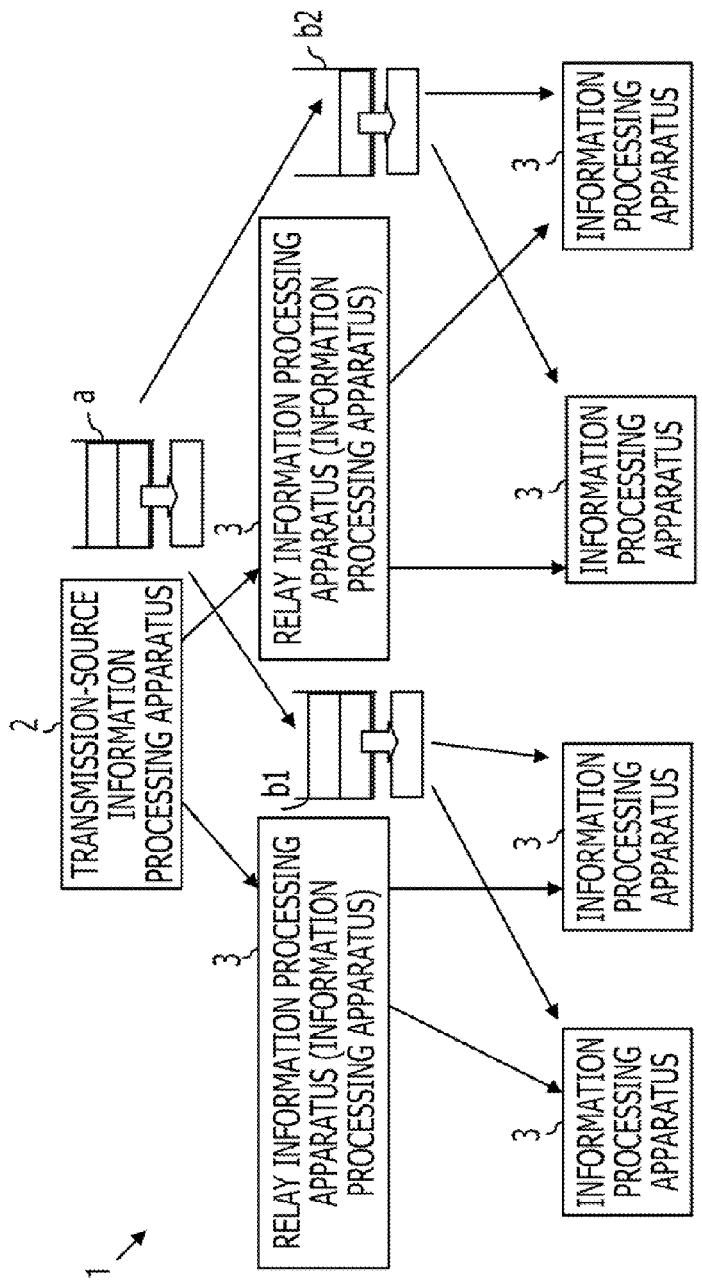
FIG. 7 illustrates an operation of the system in accordance with the embodiment.

FIG. 7 illustrates an operation of a system 1 constructed as described above as one embodiment.

In the system of FIG. 7, the transmission-source information processing apparatus 2 selects, as two relay information processing apparatuses, two processing apparatus 3 from six processing apparatuses 3.

The first deployment unit 214 in the transmission-source information processing apparatus 2 transmits the fragmented image file to the processing apparatus 3 functioning as the relay information processing apparatus via multicast communication. The transmitted image file is stored on the reception buffer 336 in the relay information processing apparatus. The storage unit 311 in the relay information processing apparatus successively stores the image files stored on the reception buffer 336 to the storage device 32 as the deployment image 320 while also storing the image file on the transmission buffer 335. The second deployment unit 310 in the relay information processing apparatus relay-transmits the image file from the transmission buffer 335 to the processing apparatus 3 via multicast communication. The two relay information processing apparatuses transmit the image file to the processing apparatuses 3 thereunder via multicast communication. The image file is thus transmitted to all the processing apparatuses 3 including the processing apparatuses 3 functioning as the relay information processing apparatuses.

More specifically, the relay information processing apparatus further transmits the image file deployed via multicast communication to the processing apparatuses 3 via multicast communication. The image file is thus transmitted to all the processing apparatuses 3.

The label "a" in FIG. 7 represents a transmission buffer of the transmission-source information processing apparatus 2. The labels "b1" and "b2" in FIG. 7 represent the transmission buffers 335 of the processing apparatuses 3 respectively functioning as the relay information processing apparatuses. Rectangles within each transmission buffer 335 represent fragmented image files. As illustrated in FIG. 7, the transmission buffers b1 and b2 are different in size of retained image file because the transmission buffers b1 and b2 are different from each other in communication status between the relay information processing apparatus and the processing apparatus 3.

A deployment method of the image file in the system 1 of the embodiment thus constructed is described with reference to a flowchart (operations A1-A4) of FIG. 8.

The user may start deploying the image file at a specific timing, such as when an application like OS is introduced to the processing apparatus 3. The user transmits a deployment startup instruction to the CPU 21 using the input unit 24 on the transmission-source information processing apparatus 2. In response to the deployment startup instruction, the relay information processing apparatus selector 211 selects a processing apparatus 3 functioning as a relay information processing apparatus in accordance with the number of the processing apparatuses 3 and performance of the processing apparatuses 3 (A1). More specifically, the relay information processing apparatus selector 211 selects from among a plurality of information processing apparatuses an information processing apparatus that functions as a relay information processing apparatus transmitting data to another information processing apparatus. The distributing unit 213 distributes, to the processing apparatus 3 selected in A1, information causing the selected processing apparatus 3 to function as the relay information processing apparatus (A2). In other words, the distributing unit 213 distributes specific information to the selected relay information processing apparatuses. If the processing apparatus 3 selected in A1 uses the information causing the processing apparatus 3 to function as the relay information processing apparatus, the processing apparatus 3 functions as the relay information processing apparatus.

The deployment then starts (A3). When the image and the personalized information are transmitted to all the processing apparatuses 3, the deployment is complete (A4).

Figure 8:
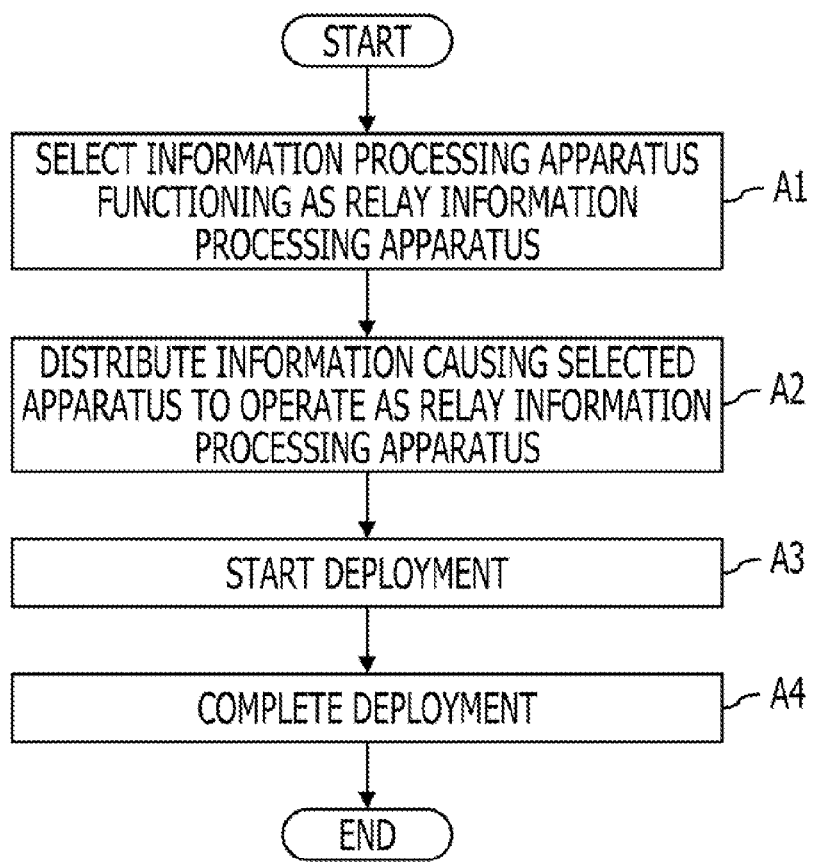
FIG. 8 is a flowchart illustrating the operation of the system in accordance with the embodiment.

The operation for selecting the processing apparatus 3 as the relay information processing apparatus, e.g., the operation in A1 of FIG. 8 is described in detail with reference to a flowchart of FIG. 9 (operations A11-A14).

Figure 10:
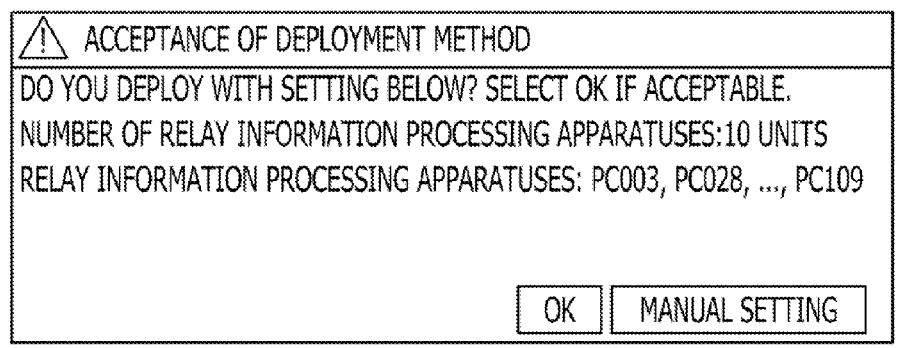
FIG. 10 illustrates an acceptance screen of a deployment method in accordance with the embodiment.

The calculating unit 212 calculates the number of needed relay information processing apparatuses in accordance with the total number of processing apparatuses 3 (A11). The relay information processing apparatus selector 211 then selects the processing apparatuses 3 of the number calculated in A11 in accordance with the performance of the processing apparatuses 3 (A12). Specifically, the relay information processing apparatuses are selected in accordance with the number of information processing apparatuses and the performance of the information processing apparatuses. More specifically, the relay information processing apparatus selector 211 calculates the number of relay information processing apparatuses in accordance with the number of information processing apparatuses, and selects the relay information processing apparatuses of the calculated number in accordance with the performance of the information processing apparatuses. The CPU 21 in the transmission-source information processing apparatus 2 checks with the user to determine whether to deploy the image file with the processing apparatus selected in A12 functioning as the relay information processing apparatus (A13). For example, the CPU 21 checks with the user by presenting a screen of FIG. 10 on the output unit 25 to the user. On the screen of FIG. 10, the CPU 21 in the transmission-source information processing apparatus 2 displays the number of relay information processing apparatuses and the machine names of the selected relay information processing apparatuses. If this setting is acceptable to the user, the user may select "OK" using the input unit 24. If the relay information processing apparatuses are to be manually selected, the user may select "manual setting." The user thus manually selects the number of relay information processing apparatuses and/or the processing apparatuses 3 functioning as the relay information processing apparatuses.

The relay information processing apparatus is selected in A13. The determining unit 215 assigns the processing apparatus 3 as the deployment destination to the relay information processing apparatus (A14).

Figure 9:
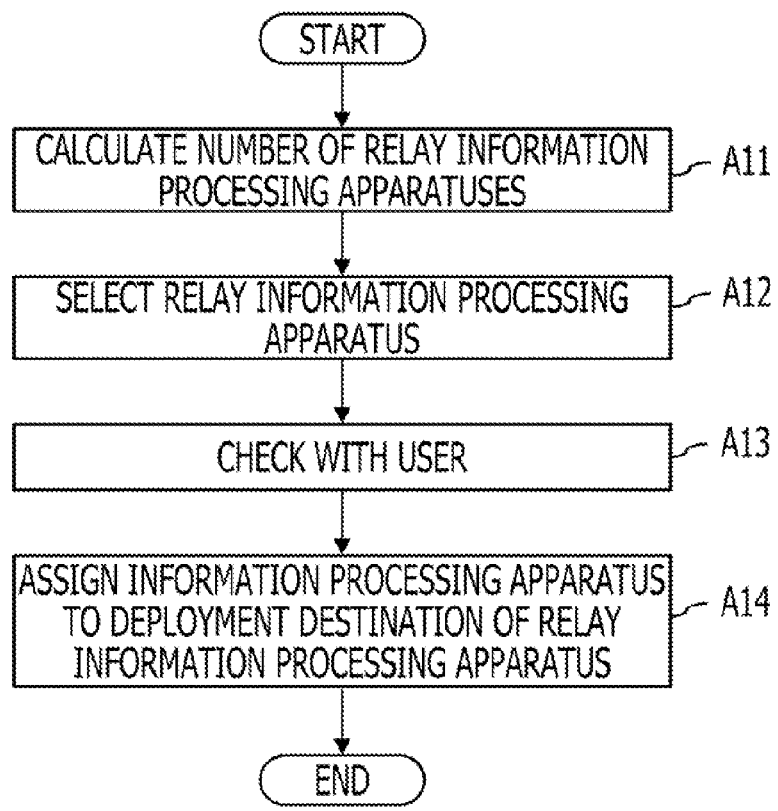
FIG. 9 is a flowchart illustrating an operation of a relay information processing apparatus selector in accordance with the embodiment.
Figure 11:
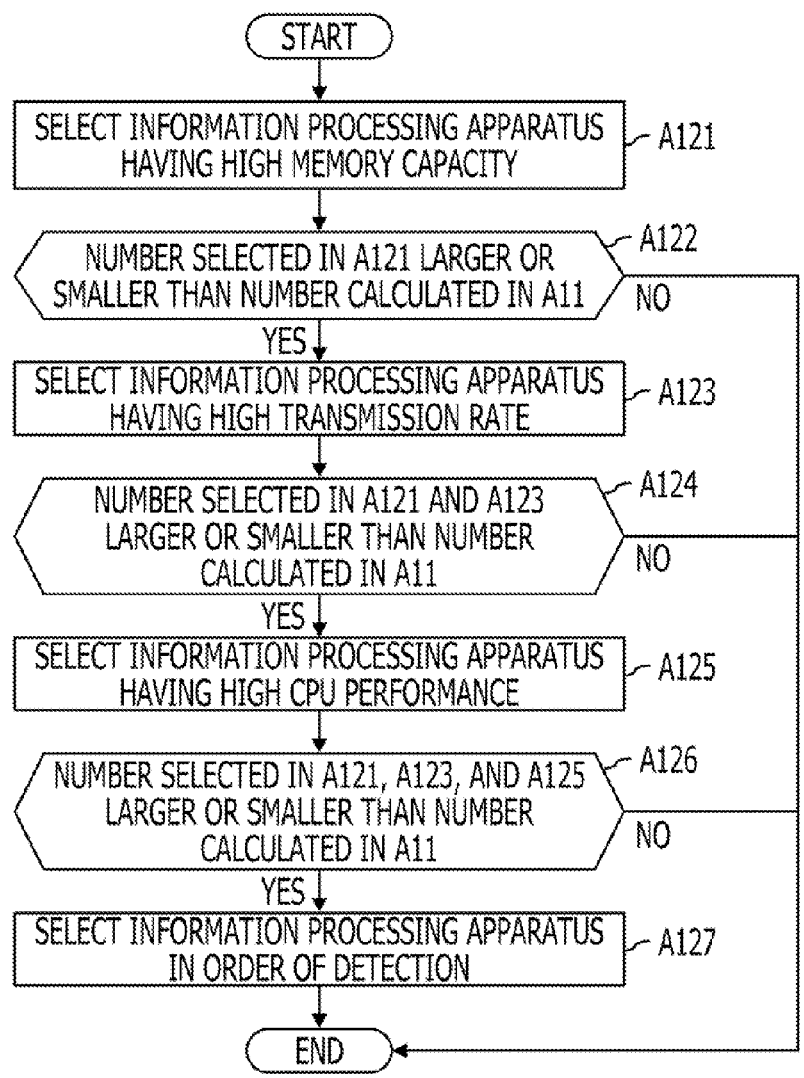
FIG. 11 is a flowchart illustrating in detail the operation of the relay information processing apparatus selector in accordance with the embodiment.

In A12 of FIG. 9, the processing apparatuses 3 of the number calculated in A11 are selected in accordance with the performance information of the processing apparatuses 3. The operation in A12 of FIG. 9 is described in detail below with reference to a flowchart of FIG. 11 (operations A121-A127).

The relay information processing apparatus selector 211 references the processing apparatus performance information 220, thereby selecting the processing apparatuses 3 successively in the order of large to small memory capacity (A121). Optionally, the relay information processing apparatus selector 211 may select a processing apparatus 3 in the order from high to low memory capacity from the processing apparatuses 3 having a memory capacity equal to or higher than a specific value.

The relay information processing apparatus selector 211 then determines whether the number of processing apparatuses 3 selected in A121 is larger or smaller than the number calculated in A11 of FIG. 9 (A122). If the number of processing apparatuses 3 selected in A121 is equal to the number calculated in A11 of FIG. 9 ("NO" branch from A122), A12 is complete. If the number of processing apparatuses 3 selected in A121 is larger or smaller than the number calculated in A11 of FIG. 9 ("YES" branch from A122), the relay information processing apparatus selector 211 selects the processing apparatus 3 in the order of high to low transmission rate (A123). Optionally, the relay information processing apparatus selector 211 may select a processing apparatus 3 in the order from high to low transmission rate from the processing apparatuses 3 having a transmission rate equal to or higher than a specific value.

If the processing apparatuses 3 having a memory capacity equal to or higher than the specific value are lacking in number, the relay information processing apparatus selector 211 selects the processing apparatuses 3 of the number equal to the lacking number in the order from high to low transmission rate. For example, if the number of processing apparatuses 3 selected in A121 is larger than the number calculated in A11, the relay information processing apparatus selector 211 selects the processing apparatuses 3 in the order of high to low transmission rate from the processing apparatuses 3 having the same memory capacity. More specifically, the relay information processing apparatus selector 211 selects the processing apparatuses 3 in the order of high to low transmission rate from the processing apparatuses 3 having the same memory capacity. This is because the processing apparatuses 3 having the same memory capacity are larger in number than the number calculated in A11.

The relay information processing apparatus selector 211 determines whether the number of processing apparatuses 3 selected in A121 and A123 is larger or smaller than the number calculated in A11 (A124). If the number of processing apparatuses 3 selected in A121 and A123 is equal to the number calculated in A11 ("NO" branch from A124), A12 is complete. If the number of processing apparatuses 3 selected in A121 and A123 is larger than or smaller than the number calculated in A11 ("YES" branch from A124), the relay information processing apparatus selector 211 selects the processing apparatuses 3 in the order from high to low CPU performance (clock frequency, for example) (A125). Optionally, the relay information processing apparatus selector 211 may select a processing apparatus 3 in the order from high to low CPU performance from the processing apparatuses 3 having a CPU performance level equal to or higher than a specific value.

If the processing apparatuses 3 having the memory capacity equal to or higher than the specific value thereof and the transmission rate equal to or higher than the specific value thereof are lacking in number, the relay information processing apparatus selector 211 selects the processing apparatuses 3 of the number equal to the lacking number in the order from high to low CPU performance. For example, if the number of processing apparatuses 3 selected in A121 and A123 is larger than the number calculated in A11, the relay information processing apparatus selector 211 selects the processing apparatuses 3 in the order of high to low CPU performance from the processing apparatuses 3 having the same memory capacity and the same transmission rate. More specifically, the relay information processing apparatus selector 211 selects the processing apparatuses 3 in the order of high to low CPU performance from the processing apparatuses 3 having the same memory capacity and the same transmission rate. This is because the processing apparatuses 3 having the same memory capacity and the same transmission rate are larger in number than the number calculated in A11.

The relay information processing apparatus selector 211 determines whether the number of processing apparatuses 3 selected in A121, A123, and A125 is larger than or smaller than the number calculated in A11 (A126). If the number of processing apparatuses 3 selected in A121, A123, and A125 is equal to the number calculated in A11 ("NO" branch from A126), A12 is complete. If the number of processing apparatuses 3 selected in A121, A123, and A125 is larger than or smaller than the number calculated in A11 ("YES" branch from A126), the relay information processing apparatus selector 211 selects the processing apparatuses 3 in the order in accordance with which the relay information processing apparatus selector 211 has detected the processing apparatuses 3 from the processing apparatus performance information 220 (A127).

More specifically, if the processing apparatuses 3 having the memory capacity, the transmission rate and the CPU performance equal to or higher than the specific values thereof are lacking in number, the relay information processing apparatus selector 211 selects the processing apparatuses 3 of the number equal to the lacking processing apparatus 3 in the order in accordance with which the relay information processing apparatus selector 211 has detected the processing apparatuses 3 from the processing apparatus performance information 220. The number of processing apparatuses 3 selected in A121, A123, and A125 may be larger than the number calculated in A11, for example. In such a case, the relay information processing apparatus selector 211 selects the processing apparatuses 3 in the order of detection from the processing apparatuses 3 having the same memory capacity, the same transmission rate, and the same CPU performance and larger than in number than the number calculated in A11.

Through A121-A127, the relay information processing apparatus selector 211 selects the processing apparatuses 3 of the number calculated in A11.

Figure 12A:
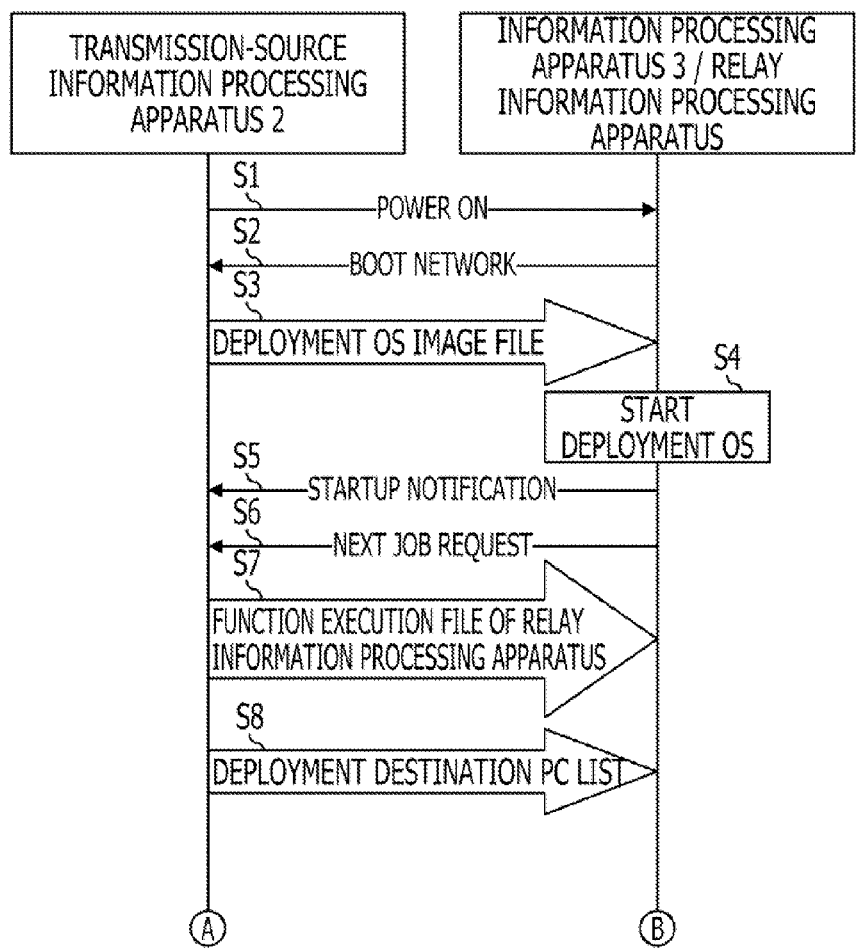
Figure 12C:
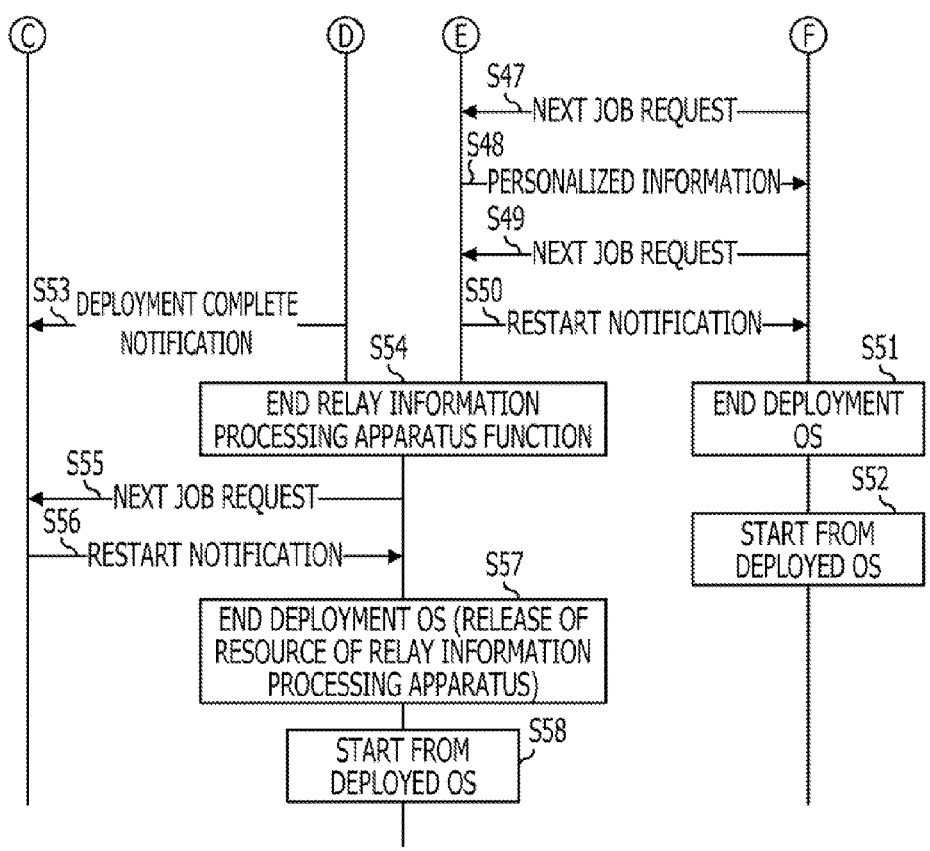
Figure 16:
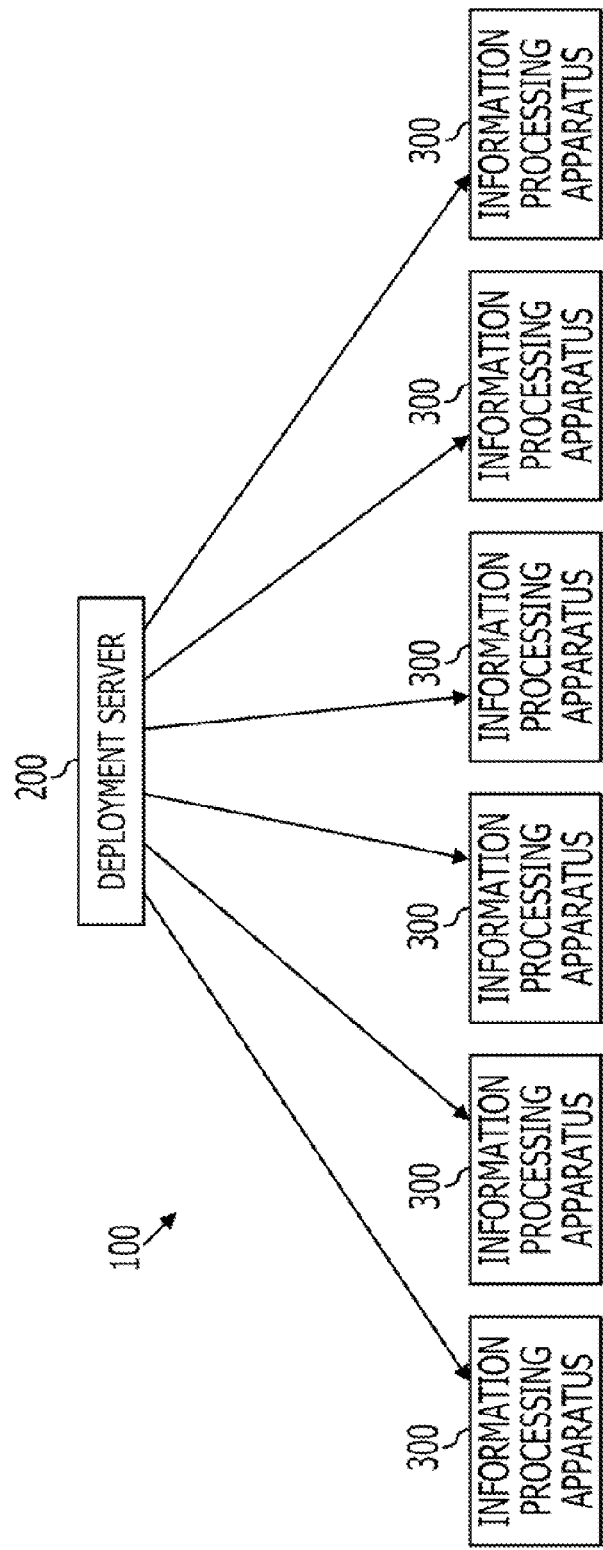
FIG. 16 illustrates a related-art system.

The operation of the system 1 as the embodiment is described below with reference to a flowchart of FIGS. 12A, 12B and 12C.

The transmission-source information processing apparatus 2 powers on the processing apparatus 3 functioning as a relay information processing apparatus via a network such as a LAN (S1). The processing apparatus 3 powered on requests the transmission-source information processing apparatus 2 to boot a network (S2). The network boot is Preboot eXecution Environment (PXE) boot, for example. In response to the network boot request, the transmission-source information processing apparatus 2 distributes the deployment OS image 222 to the processing apparatus 3 (S3). The processing apparatus 3 receives the deployment OS image 222 while executing the deployment OS image 222. The processing apparatus 3 thus starts the deployment OS on the RAM 33 (S4).

Upon starting the deployment OS on the RAM 33, the processing apparatus 3 notifies the transmission-source information processing apparatus 2 of the startup and transmits a next job request (S5 and S6). Upon receiving the startup notification and the next job request, the transmission-source information processing apparatus 2 distributes to the processing apparatus 3 the function execution file 224 of the relay information processing apparatus and the processing apparatus list 333 as part of the processing apparatus list 221 in order to start the processing apparatus 3 as the relay information processing apparatus (S7 and S8). The part of the processing apparatus list 221 is information indicating that the processing apparatus 3 functioning as the relay information processing apparatus is the processing apparatus 3 that deploys the image file. The deployment destination of each relay information processing apparatus is different from relay information processing apparatus to relay information processing apparatus. For this reason, the processing apparatus list 333 as the part of the processing apparatus list 221 is may be transmitted to the relay information processing apparatus via unicast communication.

Upon receiving the function execution file 224 of the relay information processing apparatus and the processing apparatus list 221, the processing apparatus 3 executes the function execution file 224 of the relay information processing apparatus using the deployment OS. The processing apparatus 3 starts up the function as the relay information processing apparatus (S9). The relay information processing apparatus transmits a next job request to the transmission-source information processing apparatus 2 (S10). Upon receiving the next job request, the transmission-source information processing apparatus 2 distributes the deployment OS image 222 to the relay information processing apparatus (S11).

In a switching control operation between the relay information processing apparatus and the processing apparatus 3 as the deployment destination of the relay information processing apparatus, the relay information processing apparatus powers on the processing apparatus 3 as the deployment destination (S12). The processing apparatus 3 powered on transmits a network boot request to the relay information processing apparatus (S13). Upon receiving the network boot request, the relay information processing apparatus distributes to the processing apparatuses 3 the deployment OS image 222 distributed in S11 (S14). Upon receiving the deployment OS image 222, the processing apparatus 3 executes the deployment OS image 222. The deployment OS starts up on the RAM 33 (S15). In response to the reception of the deployment OS image 222, the relay information processing apparatus transmits a next job request (S16). Upon receiving the next job request, the transmission-source information processing apparatus 2 distribute the deployment execution file 223 to the relay information processing apparatuses (S17). The relay information processing apparatus receives the deployment execution file 223, executes the deployment execution file 223, and transmits a next job request to the transmission-source information processing apparatus 2 (S18).

The processing apparatus 3 with the deployment OS starting up thereon transmits a startup notification and a next job request to the relay information processing apparatus (S19 and S20). In response to the reception of the next job request, the relay information processing apparatus copies the deployment execution file 223 received in S17 and then distributes the copy of the deployment execution file 223 to the processing apparatuses 3 (S21). Upon receiving the next job request in S18, the transmission-source information processing apparatus 2 transmits an image file transfer start notification to the relay information processing apparatus (S22). Upon receiving the image file transfer start notification, the relay information processing apparatus transmits to the transmission-source information processing apparatus 2 an reception notification to the effect that the image file transfer start notification has been received (S23). In response to the reception of the reception notification, the transmission-source information processing apparatus 2 transmits to the relay information processing apparatus an image file #1 as one of N-fragmented files (S24). Upon receiving the image file #1, the relay information processing apparatus stores the image file #1 on the reception buffer 336 and then transmits a reception notification to the transmission-source information processing apparatus 2 (S25). The storage unit 311 in the relay information processing apparatus stores the image file #1 on the storage device 32 and the transmission buffer 335. In response to the reception of the reception notification, the transmission-source information processing apparatus 2 performs together with the relay information processing apparatus the same operations as in S24 and S25 on the remaining fragmented image files #2-#N (S26-S31). Specifically, in S24, S26, S28, and S30, the transmission-source information processing apparatus 2 transmits the data to the relay information processing apparatuses.

The processing apparatus 3 as the deployment destination of the relay information processing apparatus executes the deployment execution file 223 distributed in S21 and transmits a new job request to the relay information processing apparatus (S32). Upon receiving the new job request, the relay information processing apparatus transmits an image file transfer start notification to the processing apparatus 3 (S33). Upon receiving the image file transfer start notification, the processing apparatus 3 transmits to the relay information processing apparatus a reception notification to the effect that the image file transfer start notification has been received (S34). In response to the reception of the reception notification, the relay information processing apparatus relay-transmits to the processing apparatus 3 the fragmented image file #1 stored on the transmission buffer 335 (S35). Upon receiving the image file #1, the processing apparatus 3 transmits a reception notification to the relay information processing apparatus (S36), and stores the image file #1 on the storage device 32. In response to the reception of the reception notification, the relay information processing apparatus performs together with the processing apparatuses 3 as the deployment destinations the same operations as those in S35 and S36 on the remaining fragmented image files #2-#N (S37-S42). Specifically, in S35, S37, S39, and S41, the relay information processing apparatus relay-transmits the data received from the transmission-source information processing apparatus 2 to the processing apparatuses 3.

Upon completing the transmission of all the fragmented image files, the transmission-source information processing apparatus 2 transmits an image file complete notification to the relay information processing apparatus (S43). In response to the reception of the image file complete notification, the relay information processing apparatus transmits a new job request to the transmission-source information processing apparatus 2 (S44). The transmission-source information processing apparatus 2 receives the new job request, and distributes to the relay information processing apparatus the personalized information of the relay information processing apparatus and the personalized information of the processing apparatus 3 at the deployment destination of the relay information processing apparatus, included in the processing apparatus list 221 (S45). The storage unit 311 in the relay information processing apparatus writes on the storage device 32 the personalized information of own apparatus out of the received personalized information. When the personalized information of the relay information processing apparatus and the personalized information of the processing apparatus 3 at the deployment destination of the relay information processing apparatus are transmitted to the relay information processing apparatuses, unicast communication is used. This is because the personalized information is different from relay information processing apparatus to relay information processing apparatus.

The relay information processing apparatus receives the reception notification in S42, and transmits the image file complete notification to the processing apparatus 3 as the deployment destination (S46). The processing apparatus 3 as the deployment destination having received the image file complete notification transmits a new job request to the relay information processing apparatus (S47). In response to the reception of the next job request, the relay information processing apparatus distributes the personalized information of the processing apparatus 3 as the deployment destination out of the personalized information received in S45 (S48). The storage unit 311 in the processing apparatus 3 writes the received personalized information on the storage device 32. The personalized information is different from apparatus to apparatus of the processing apparatuses 3 as the deployment destinations. The relay information processing apparatus thus transmits the personalized information via unicast communication. The processing apparatus 3 receives the personalized information and transmits a next job request to the relay information processing apparatus (S49). The relay information processing apparatus receives the next job request and transmits a restart notification to the processing apparatus 3 as the deployment destination (S50). In response to the reception of the restart notification, the processing apparatus 3 starts, thereby releasing the deployment OS running on the RAM 33 as a volatile memory. At a restart operation, the processing apparatus 3 starts using only the deployed OS stored on the storage device 32 (S51 and S52).

After transmitting the restart notification to all the processing apparatuses 3 as the deployment destinations in S50, the relay information processing apparatus transmits a deployment complete notification to the transmission-source information processing apparatus 2 (S53). The process performed heretofore completes the function of the relay information processing apparatus (S54). If the relay information processing apparatus transmits a next job request to the transmission-source information processing apparatus 2 (S55), the transmission-source information processing apparatus 2 transmits a restart notification to the relay information processing apparatus (S56). Upon receiving the restart notification, the relay information processing apparatus restarts. The restart releases the deployment OS running on the RAM 23 as a volatile memory and the function execution file 224 of the relay information processing apparatus (S57). The processing apparatus 3 having functioned as the relay information processing apparatus starts up with the deployment OS stored on the storage device 32 at the restart (S58). More specifically, the processing apparatus 3 having functioned as the relay information processing apparatus loses the function as the relay information processing apparatus at the restart, and becomes equal to the other processing apparatuses 3 in function.

A process performed between the transmission-source information processing apparatus 2 and the relay information processing apparatus according to the embodiment is described below with reference to a flowchart of FIG. 13.

The CPU 31 in the processing apparatus 3 starts the function execution file 331 of the relay information processing apparatus. The processing apparatus 3 thus starts as a relay information processing apparatus (B0). After transmitting a next job request to the transmission-source information processing apparatus 2, the relay information processing apparatus acquires the deployment OS image 222 to transmit the deployment OS image 222 to the processing apparatus 3 as the deployment destination (B1). Upon acquiring the deployment OS image 222, the relay information processing apparatus starts deploying the deployment OS image 222 on the processing apparatus 3 as the deployment destination (B20 of FIG. 14 to be discussed later). The relay information processing apparatus then transmits a next job request to the transmission-source information processing apparatus 2 and acquires the deployment execution file 223 from the transmission-source information processing apparatus 2 (B2).

After transmitting the next job request to the transmission-source information processing apparatus 2, the relay information processing apparatus receives an image file transfer start notification from the transmission-source information processing apparatus 2 (B3). Upon receiving the image file transfer start notification, the relay information processing apparatus transmits a reception notification to the transmission-source information processing apparatus 2 (B4). The relay information processing apparatus determines whether an image file complete notification has been received (B5). If the image file complete notification has not been received ("NO" branch from B5), the relay information processing apparatus receives from the transmission-source information processing apparatus 2 the fragmented image file at the reception buffer 336 (B6). The relay information processing apparatus writes the received image file on the storage device 32 while also storing the received image file on the transmission buffer 335 (B7 and B8).

If the image file is written on the storage device 32 and stored on the transmission buffer 335 (B9), processing returns to B4. Operations in B4-B9 are repeated until the relay information processing apparatus has received the image file complete notification from the transmission-source information processing apparatus 2.

Upon receiving the image file complete notification ("YES" branch from B5), the relay information processing apparatus transmits a next job request to the transmission-source information processing apparatus 2. The relay information processing apparatus receives the personalized information 225 from the transmission-source information processing apparatus 2 (B10). The personalized information 225 received here includes the personalized information of the relay information processing apparatus and the personalized information of the processing apparatus 3 as the deployment destination of the relay information processing apparatus. The relay information processing apparatus writes the personalized information of own apparatus out of the received personalized information on the storage device 32 (B11). The relay information processing apparatus stores the personalized information of the processing apparatus 3 as the deployment destination on the transmission buffer 335 (B12). After deploying the image file on the processing apparatus 3 as the deployment destination (B32 of FIG. 14 to be discussed later), the relay information processing apparatus transmits a deployment complete notification to the transmission-source information processing apparatus 2 (B13).

The relay information processing apparatus restarts in response to the reception of a restart notification from the transmission-source information processing apparatus 2 (B14). At the restart, the function execution file 224 of the relay information processing apparatus running on the RAM 33 is released. The function as the relay information processing apparatus is canceled (B15). More specifically, the processing apparatus 3 having functioned as the relay information processing apparatus loses the function as the relay information processing apparatus at the restart, and becomes each to each of the other processing apparatuses 3.

A process performed between the relay information processing apparatus and the processing apparatus 3 as the deployment destination of the relay information processing apparatus is described with a flowchart of FIG. 14.

Upon acquiring the deployment OS image 222 in B1 of FIG. 13, the relay information processing apparatus deploys the deployment OS image 222 on the processing apparatus 3 as the deployment destination (B20). The relay information processing apparatus first powers on the processing apparatus 3 as the deployment destination (B21). The relay information processing apparatus receives a network boost request from the processing apparatus 3 powered on as the deployment destination (B22), and transmits the deployment OS image 222 to the processing apparatus 3 (B23). The processing apparatus 3 as the deployment destination starts the deployment OS using the deployment OS image 222. Upon receiving the startup notification, the relay information processing apparatus transmits the deployment execution file 223 to the processing apparatus 3 (B24). The relay information processing apparatus receives a next job request from the processing apparatus 3 having received the deployment execution file 223, and transmits an image file transfer start notification to the processing apparatus 3 (B25). The relay information processing apparatus receives (verifies) a reception notification from the processing apparatus 3 having received the transfer start notification (B26), and determines whether to transmit an image file complete notification to the processing apparatus 3 as the deployment destination (B27). If all the fragmented image files are transmitted, the image file complete notification is transmitted to the processing apparatus 3. If not all the fragmented image files are transmitted, the image file complete notification is not transmitted to the processing apparatus 3.

If the image file complete notification is not transmitted ("NO" branch from B27), the relay information processing apparatus acquires the image file from the transmission buffer 335 (B28), relay-transmits the image file to the processing apparatus 3 as the deployment destination (B29), and then returns to B26. Operations in B26-B29 are repeated until the relay information processing apparatus transmits all the fragmented image files to the processing apparatus 3 as the deployment destination, and the image file complete notification is transmitted.

Upon transmitting the image file complete notification to the processing apparatus 3 as the deployment destination ("YES" branch from B27), the relay information processing apparatus transmits, to the processing apparatus 3 as the deployment destination, the related personalized information out of the personalized information stored on the transmission buffer 335 (B30). The relay information processing apparatus transmits a restart instruction to the processing apparatus 3 in response to a next job request from the processing apparatus 3 as the deployment destination (B31). The relay information processing apparatus completes the deployment on the processing apparatus 3 as the deployment destination by transmitting the restart instruction (B32).

In the system 1 of the embodiment, the transmission-source information processing apparatus 2 is free from directly deploying the image file on all the processing apparatuses 3 with one of the processing apparatuses 3 functioning as the relay information processing apparatus. The time to deploy the image file is thus shortened.

The number of relay information processing apparatuses providing the shortest time to deploy is calculated in accordance with the number of processing apparatuses 3. The relay information processing apparatuses are generated in accordance with the calculated number of relay information processing apparatuses. The time to deploy is shortened.

The processing apparatuses 3 functioning as the relay information processing apparatuses are selected in accordance with the performance of the processing apparatuses 3. A highly reliable deployment server thus results. The image file is reliably deployed.

The system 1 of the embodiment shortens the deployment time without using a plurality of transmission-source information processing apparatuses.

In the system 1 of the embodiment, the information for causing the processing apparatus to operate as the relay information processing apparatus is stored on the RAM 33 of the processing apparatus 3. The system is thus free from installing the OS and the like, and setting software applications on a plurality of transmission-source information processing apparatuses. The workload on the user is reduced.

According to the embodiment, the transmission-source information processing apparatus 2 automatically generates at least one relay information processing apparatus. The user is free from selecting the relay information processing apparatus. The workload on the user is reduced.

According to the embodiment, the processing apparatus 3 having functioned as a relay information processing apparatus loses the function as the relay information processing apparatus at the restart, and becomes equal to the other processing apparatuses 3 in function. In the operation after the deployment, the processing apparatus 3 having functioned as the relay information processing apparatus is handled in the same manner as the other processing apparatuses 3.

B. Description of Modifications

In the above discussion of the embodiment, the calculating unit 212 operates in the setup of the system 1 where 110 processing apparatuses 3 are connected to the same switch as that of the transmission-source information processing apparatus 2, and the image file A is deployed on all the processing apparatuses 3.

The calculating unit 212 is not limited to this setup. The calculating unit 212 may operate as described below if a plurality of processing apparatuses 3 are connected to the transmission-source information processing apparatus 2 via different switches, or if a plurality of image files are deployed.

A group of networks in which the transmission-source information processing apparatus 2 is connected to the processing apparatuses 3 via network devices is referred to as a segment.

The operation of the calculating unit 212 is described below if the calculating unit 212 is operated in the setup of 110 processing apparatuses 3, five segments A-E, and one type of image file. The five segments A-E include 20 processing apparatuses 3, 20 processing apparatuses 3, 30 processing apparatuses 3, 20 processing apparatuses 3, and 20 processing apparatuses 3, respectively.

If the system 1 includes a plurality of segments, the calculating unit 212 calculates the needed number of relay information processing apparatuses on a per segment basis. More specifically, the calculating unit 212 substitutes the number of processing apparatuses 3 forming each segment in Equation (6), thereby calculating the needed number of relay information processing apparatuses. The needed numbers of relay information processing apparatuses in the segments A-E are 4, 4, 5, 4, and 4, respectively. The calculating unit 212 determines the number of relay information processing apparatuses on a per segment basis in accordance with the number of information processing apparatuses belonging to each element.

The determining unit 215 determines the processing apparatus 3 functioning as the deployment destination of the relay information processing apparatus on a per segment basis. More specifically, the determining unit 215 determines the processing apparatus 3 as the deployment destination in accordance with the number of processing apparatuses 3 belonging to one segment and the number of relay information processing apparatuses belonging to one segment.

If processing apparatuses 3 are arranged in a plurality of segments, a relay information processing apparatus is generated on a per segment basis, and the deployment is performed.

Discussed below is the operation of the calculating unit 212 in the setup of 110 processing apparatuses 3, a segment, and four types of image file. The four types of image files A-D are transmitted to 30 processing apparatuses 3, 30 processing apparatuses 3, 30 processing apparatuses 3, and 20 processing apparatuses 3, respectively.

If the transmission-source information processing apparatus 2 transmits a plurality of types of image file, the calculating unit 212 calculates the needed number of relay information processing apparatuses on a per type basis of the transmitted image files. More specifically, the calculating unit 212 substitutes in Equation (6) the number of processing apparatuses 3 to which the same type of image file is transmitted. The needed number of relay information processing apparatuses is calculated. More specifically, 5, 5, 5, and 4 relay information processing apparatuses are used for the image files A-D, respectively. The calculating unit 212 sets in a group a plurality of information processing apparatuses, to which data of the same type is transmitted, and determines the number of relay information processing apparatuses on a per group basis in accordance with the number of information processing apparatuses in the group.

The determining unit 215 determines the processing apparatus 3 as the deployment destination of the relay information processing apparatus on a per image file type. In other words, the determining unit 215 determines the relay information processing apparatus in accordance with the number of processing apparatuses 3 within the group and the number of relay information processing apparatuses within the group.

If a plurality of image files are deployed in this way, the relay information processing apparatus is generated on a per image file type basis, and the deployment is performed.

Discussed below is the operation of the calculating unit 212 in the setup of 150 processing apparatuses 3, three segments, and three types of image file. The three segments A-C include 60, 60, and 30 processing apparatuses 3, respectively. In the segment A, three types of image files A-C are transmitted to 20 processing apparatuses 3, 20 processing apparatuses 3, and 20 processing apparatuses 3, respectively.

In the segment B, two types of image files A and B are transmitted to 30 processing apparatuses 3, and 30 processing apparatuses 3. In the segment C, one type of image file C is transmitted to the 30 processing apparatuses 3. FIG. 15A illustrates a relationship of the processing apparatuses 3, the segments, and the image files.

The calculating unit 212 operates as described below if the system 1 includes a plurality of segments, and the transmission-source information processing apparatus 2 transmits a plurality of types of image file. The calculating unit 212 substitutes in Equation (6) the number of processing apparatuses 3 on a per image type basis and on a per segment basis, and thus calculates the number of relay information processing apparatuses. The number of relay information processing apparatuses is calculated as illustrated in FIG. 15B. The calculating unit 212 sets in a group a plurality of information processing apparatuses to which the same type of data is transmitted, out of a plurality of information processing apparatuses belonging to one segment, and determines the number of relay information processing apparatuses on a per group basis in accordance with the number of information processing apparatuses within the group.

The determining unit 215 then determines the processing apparatus 3 as the deployment destination of the relay information processing apparatus on a per segment basis and on a per image file type basis of the image files to be transmitted. More specifically, the determining unit 215 determines the information processing apparatus as the relay-transmission destination in accordance with the number of processing apparatuses 3 within the group and the number of relay information processing apparatuses within the group.

In this way, the calculating unit 212 calculates the number of relay information processing apparatuses on a per segment basis and/or on a per image file type basis. In response to the calculation results of the calculating unit 212, the relay information processing apparatus generating unit 210 causes the processing apparatus 3 to function as the relay information processing apparatus. The system 1 deploys the image file efficiently.

C. Description of Alternate Embodiments

The technique discussed herein is not limited to the embodiments, and modifications and changes of the technique are possible without departing from the scope of the embodiments.

According to the embodiment, the number of processing apparatuses 3 which the image file is deployed on is substituted in Equation (6) to determine the number of relay information processing apparatuses. The technique is not limited to the arrangement.

According to the embodiment, the first deployment unit 214 transmits to the relay information processing apparatus the personalized information of the relay information processing apparatus and the personalized information of the processing apparatus 3 as the deployment destination of the relay information processing apparatus. The technique is not limited to this arrangement. For example, the first deployment unit 214 may transmit to the relay information processing apparatus the personalized information 225 of all the processing apparatuses 3. In such a case, the relay information processing apparatus selects from the personalized information 225 of all the processing apparatuses 3 the personalized information of own apparatus and the personalized information of the processing apparatus 3 as the deployment destination.

According to the embodiment, the distributing unit 213 transmits part of the processing apparatus list 221 responsive to the relay information processing apparatus as the transmission destination. The technique is not limited to this arrangement. For example, the distributing unit 213 may transmit all the processing apparatus list 221 to the relay information processing apparatus. In such a case, the relay information processing apparatus may select from all the processing apparatus list 221 information indicating the processing apparatus 3 as the deployment destination on which the relay information processing apparatus deploys the image file.

According to the embodiment, the relay information processing apparatus selector 211 selects the processing apparatus 3 functioning as the relay information processing apparatus in accordance with the performance information of the processing apparatus 3 related to the memory capacity, the transmission rate, and the CPU performance. The technique is not limited to this arrangement.

According to the embodiment, the relay information processing apparatus selector 211 selects the processing apparatus 3 functioning as the relay information processing apparatus with the top priority placed on the memory capacity of the processing apparatus 3. The technique is not limited to this arrangement. For example, the relay information processing apparatus selector 211 may select the processing apparatus 3 with the top priority placed on the transmission rate of the processing apparatus 3. Alternatively, the relay information processing apparatus selector 211 may select the processing apparatus 3 with the top priority placed on the CPU performance of the processing apparatus 3.

According to the embodiment, the determining unit 215 determines the processing apparatus 3 as the deployment destination of the relay information processing apparatus before the distributing unit 213 distributes the information for causing the processing apparatus 3 to function as the relay information processing apparatus. The technique is not limited to this arrangement. For example, the distributing unit 213 distributes the information for causing the processing apparatus 3 to function as the relay information processing apparatus, before the relay information processing apparatus selector 211 selects the processing apparatus 3 as the relay information processing apparatus, and the determining unit 215 determines the processing apparatus 3 as the deployment destination of the relay information processing apparatus.

According to the embodiment, the relay information processing apparatus acquires the deployment OS image 222 from the transmission-source information processing apparatus 2 before the deployment on the processing apparatus 3 as the deployment destination starts and the processing apparatus 3 is powered on. The technique is not limited to this arrangement. For example, the relay information processing apparatus powers on the processing apparatus 3 as the deployment destination before the deployment on the processing apparatus 3 as the deployment destination.

According to the embodiment, the data is transmitted from the transmission-source information processing apparatus 2 to the processing apparatuses 3 including the relay information processing apparatus, and then relay-transmitted by the relay information processing apparatus. The data is an image file in the above discussion. The data is not limited to the image file. For example, the data transmitted from the transmission-source information processing apparatus 2 to the processing apparatuses 3 including the relay information processing apparatus and then relay-transmitted by the relay information processing apparatus may a variety of data in addition to the image file.

A variety of application programs implementing the functions of the CPU in each of the transmission-source information processing apparatus 2 and the processing apparatus 3 may be provided in a recorded state on computer readable recording media. Such recording media include a flexible disc, compact discs (CDs) (including CD-ROM, CD-R, CD-RW), digital versatile discs (DVDs) (including DVD-ROM, DVD-RAM, DVD-R, DVD+R, DVD-RW, DVD+RW, and high-definition (HD) DVD), blu-ray disc, magnetic disc, optical disc, and magnetic optical disc. A computer reads the program from the recording medium, and transfers the program to an internal storage device or an external storage device for use. The program may be stored on the storage device of the magnetic disc, the optical disc, or the magneto-optical disc, and then supplied to the computer from the storage device via a communication line.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has (have) been described in detail, it should be understood that the various changes, substitutions, and alterations could be made hereto without departing from the spirit and scope of the invention.

What is claimed is:

1. A data transmission method for transmitting data from a transmission-source information processing apparatus to a plurality of information processing apparatuses, the data transmission method comprising:

selecting, by the transmission-source information processing apparatus, one or more information processing apparatuses from among the plurality of information processing apparatuses to function as a relay information processing apparatus which relay-transmits data to another information processing apparatus, based on a number of the one or more information processing apparatuses determined by estimating time to transmit data from the transmission-source information processing apparatus to the another information processing apparatus through the selected one or more information processing apparatuses;

causing, by the transmission-source information processing apparatus, the selected one or more information processing apparatuses to function as the relay information processing apparatus;

transmitting the data to the selected one or more information processing apparatuses; and relay-transmitting the data received from the transmission-source information processing apparatus to the another information processing apparatus, wherein the number of the one or more information processing apparatuses is determined by comparing a first period of time and a second period of time, the first period of time being a period to transmit data from the transmission-source information processing apparatus to the one or more information processing apparatuses, and the second period of time being a period to transmit the data from the one or more information processing apparatuses to the another information processing apparatus.

2. The data transmission method according to claim 1, further comprising:

selecting one or more relay information processing apparatuses in accordance with a number of the plurality of information processing apparatuses and performance of each of the plurality of information processing apparatuses;

distributing specific information to the selected one or more relay information processing apparatuses, the specific information being used to cause the selected one or more information processing apparatuses to function as the one or more relay information processing apparatuses; and storing the distributed specific information on a main memory in the one or more relay information processing apparatuses and starting the one or more relay information processing apparatuses through processing the distributed specific information on the main memory in the one or more relay information processing apparatuses.

3. The data transmission method according to claim 2, wherein the specific information includes an execution file causing the one or more relay information processing apparatuses to execute a function of relay-transmitting the data to at least one of the information processing apparatuses, and information identifying an information processing apparatus as the another information processing apparatus.

4. The data transmission method according to claim 2, further comprising calculating a number of the one or more relay information processing apparatuses in accordance with the number of the plurality of information processing apparatuses and selecting the one or more relay information processing apparatuses with respect to the calculated number in accordance with the performance of each of plurality of the information processing apparatuses.

5. The data transmission method according to claim 3, further comprising determining the another information processing apparatus as a relay-transmission destination in accordance with the number of the plurality of information processing apparatuses and a number of the one or more relay information processing apparatuses.

6. The data transmission method according to claim 5, further comprising:

setting, when the transmission-source information processing apparatus transmits a plurality of data pieces to the plurality of information processing apparatuses, a plurality of information processing apparatuses, to which data of a same type is transmitted, in a group in the selection of the one or more relay information processing apparatuses, and determining the number of the one or more relay information processing apparatuses on a per group basis in accordance with the number of information processing apparatuses in the group; and determining the another information processing apparatus as the relay-transmission destination in accordance with the number of information processing apparatuses within the group and the number of the one or more relay information processing apparatuses within the group.

7. The data transmission method according to claim 5, further comprising:

determining, when the transmission-source information processing apparatus transmits data to a plurality of information processing apparatuses belonging to a plurality of different segments, the number of one or more relay information processing apparatuses on a per segment basis in the selection of the one or more relay information processing apparatuses in accordance with the number of information processing apparatuses belonging to one segment; and determining the another information processing apparatus as the relay-transmission destination in accordance with the number of information processing apparatuses belonging to one segment and the number of one or more relay information processing apparatuses belonging to one segment.

8. The data transmission method according to claim 5, further comprising:

setting, when the transmission-source information processing apparatus transmits a plurality of different data pieces to the plurality of information processing apparatuses belonging to a plurality of different segments, a plurality of information processing apparatuses, to which data of a same type is transmitted, out of the plurality of information processing apparatuses belonging to one segment, in a group in the selection of the one or more relay information processing apparatuses, and determining the number of the one or more relay information processing apparatuses on a group basis in accordance with the number of information processing groups in the group; and determining the another information processing apparatus as the relay-transmission destination in accordance with the number of information processing apparatuses within the group and the number of the one or more relay information processing apparatuses within the group.

9. The data transmission method according to claim 1, wherein the number of the one or more information processing apparatuses is determined to be a number with which a difference between the first period of time and the second period of time is smallest in the comparison.

10. The data transmission method according to claim 2, wherein the specific information is distributed to the one or more relay information processing apparatuses via a unicast communication, and the transmitting of the data to the one or more relay information processing apparatuses and the relay-transmitting of the data to the another information processing apparatus are performed via a multicast communication.

11. The data transmission method according to claim 3, wherein the data transmitted from the transmission-source information processing apparatus to the another information processing apparatus is an image file including data of an operating system and an application program, and each of the one or more relay information processing apparatuses causes the another information processing apparatus to restart using the transmitted image file when all data of the image file has been transmitted to the another information processing apparatus.

12. The transmission method according to claim 11, wherein
each of the one or more relay information processing apparatuses is restarted by using the image file stored in each of the one or more relay information processing apparatuses after causing the another information processing apparatus to restart, so that each of the one or more relay information processing apparatuses functions as one of the plurality of information processing apparatuses restarted by using the image file.

13. A transmission-source information processing apparatus for transmitting data to a plurality of information processing apparatuses, the transmission-source information processing apparatus comprising:
circuitry configured to:
select one or more information processing apparatuses from among the plurality of information processing apparatuses to function as a relay information processing apparatus which relay-transmits data to another information processing apparatus based on a number of the one or more information processing apparatuses determined by estimating time to transmit data from the transmission-source information processing apparatus to the another information processing apparatus through the selected one or more information processing apparatuses;
cause the selected one or more information processing apparatuses to function as the relay information processing apparatus; and
transmit the data to the selected one or more information processing apparatuses, wherein
the number of the one or more information processing apparatuses is determined by comparing a first period of time and a second period of time, the first period of time being a period to transmit data from the transmission-source information processing apparatus to the one or more information processing apparatuses, and the second period of time being a period to transmit the data from the one or more information processing apparatuses to the another information processing apparatus.

14. The transmission-source information processing apparatus according to claim 13, wherein the circuitry is configured to:
select one or more relay information processing apparatuses in accordance with a number of the plurality of information processing apparatuses and performance of each of the plurality of information processing apparatuses; and
distribute specific information to the selected one or more relay information processing apparatuses, wherein the one or more relay information processing apparatuses starts up as a relay information processing apparatus when the specific information is processed on a main memory thereof.

15. The transmission-source information processing apparatus according to claim 14, wherein the specific information includes an execution file causing the one or more relay information processing apparatuses to execute a function of relay-transmitting the data to at least one of the information processing apparatuses, and information identifying an information processing apparatus as the another information processing apparatus.

16. The transmission-source information processing apparatus according to claim 14, wherein the circuitry is configured to calculate a number of the one or more relay information processing apparatuses in accordance with the number of the plurality of information processing apparatuses and select the one or more relay information processing apparatuses with respect to the calculated number in accordance with the performance of each of the plurality of information processing apparatuses.

17. The transmission-source information processing apparatus according to claim 15, wherein the circuitry is further configured to determine the another information processing apparatus to be selected as a relay-transmission destination in accordance with the number of the plurality of information processing apparatuses and a number of the one or more relay information processing apparatuses.

18. A system comprising:
a plurality of information processing apparatuses; and
a transmission-source information processing apparatus configured to transmit data to the plurality of information processing apparatuses, wherein
the transmission-source information processing apparatus includes first circuitry configured to:
select one or more information processing apparatuses from among the plurality of information processing apparatuses to function as a relay information processing apparatus which relay-transmits data to another information processing apparatus based on a number of the one or more information processing apparatuses determined by estimating time to transmit data from the transmission-source information processing apparatus to the another information processing apparatus through the selected one or more information processing apparatuses;
cause the selected one or more information processing apparatuses to function as the relay information processing apparatus; and
transmit the data to the selected one or more information processing apparatuses;
the selected one or more information processing apparatuses includes second circuitry configured to relay-transmit the data received from the transmission-source information processing apparatus to at least one of the information processing apparatuses; and
the number of the one or more information processing apparatuses is determined by comparing a first period of time and a second period of time, the first period of time being a period to transmit data from the transmission-source information processing apparatus to the one or more information processing apparatuses, and the second period of time being a period to transmit the data from the one or more information processing apparatuses to the another information processing apparatus.

19. A computer readable non-transitory medium storing a data transmission program of a transmission-source information processing apparatus to transmit data to a plurality of information processing apparatuses, the data transmission program causing a computer to perform a process, the process comprising:
selecting one or more information processing apparatuses from among the plurality of information processing apparatuses to function as a relay information processing apparatus which relay-transmits data to another information processing apparatus based on a number of the one or more information processing apparatuses determined by estimating time to transmit data from the transmission-source information processing apparatus to the another information processing apparatus through the selected one or more information processing apparatuses;
causing, by the transmission-source information processing apparatus, the selected one or more information processing apparatuses to function as the relay information processing apparatus; and
transmitting the data to the selected one or more information processing apparatuses, wherein
the number of the one or more information processing apparatuses is determined by comparing a first period of time and a second period of time, the first period of time being a period to transmit data from the transmission-source information processing apparatus to the one or more information processing apparatuses, and the second period of time being a period to transmit the data from the one or more information processing apparatuses to the another information processing apparatus.

* * * * *